US011397605B2

(12) United States Patent
Miyakoshi

(10) Patent No.: US 11,397,605 B2
(45) Date of Patent: Jul. 26, 2022

(54) MANAGEMENT SYSTEM, MANAGEMENT APPARATUS, MANAGEMENT METHOD, AND PROGRAM

(71) Applicant: NEC CORPORATION, Tokyo (JP)

(72) Inventor: Chihiro Miyakoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 243 days.

(21) Appl. No.: 16/482,313

(22) PCT Filed: Jan. 31, 2018

(86) PCT No.: PCT/JP2018/003106
§ 371 (c)(1),
(2) Date: Jul. 31, 2019

(87) PCT Pub. No.: WO2018/143235
PCT Pub. Date: Aug. 9, 2018

(65) Prior Publication Data
US 2020/0004573 A1    Jan. 2, 2020

(30) Foreign Application Priority Data

Feb. 1, 2017    (JP) .............................. JP2017-017066

(51) Int. Cl.
*G06F 9/455*    (2018.01)
*G06F 17/18*    (2006.01)

(52) U.S. Cl.
CPC .......... *G06F 9/45558* (2013.01); *G06F 17/18* (2013.01); *G06F 2009/45562* (2013.01);
(Continued)

(58) Field of Classification Search
None
See application file for complete search history.

(56) References Cited

U.S. PATENT DOCUMENTS

2015/0181462 A1* 6/2015 Iwai ...................... H04W 28/16
370/229
2015/0195162 A1    7/2015 Gandham et al.
(Continued)

FOREIGN PATENT DOCUMENTS

JP    2014-041509 A    3/2014
JP    2015-41938 A     3/2015
(Continued)

OTHER PUBLICATIONS

Pang et al., "Two Phase Distributed Congestion Management for Differentiated Services Network", 2002, IEEE, pp. 91-95. (Year: 2002).*
(Continued)

*Primary Examiner* — Kenneth Tang
(74) *Attorney, Agent, or Firm* — Sughrue Mion, PLLC

(57) ABSTRACT

A management system includes a first management node configured to instruct a second management node to perform processing for managing resources for a virtualised network function and the second management node configured to perform, in response to an instruction from the first management node, the processing for managing the resources for the virtualised network function. In the management system, when the second management node is in congestion, at least one of the first management node and the second management node performs processing for suppressing communication traffic between the first management node and the second management node.

6 Claims, 14 Drawing Sheets

(52) U.S. Cl.
CPC .............. *G06F 2009/45575* (2013.01); *G06F 2009/45587* (2013.01); *G06F 2009/45595* (2013.01)

(56) References Cited

U.S. PATENT DOCUMENTS

| | | | | |
|---|---|---|---|---|
| 2016/0321112 | A1* | 11/2016 | Iwashina | G06F 9/45558 |
| 2017/0150399 | A1 | 5/2017 | Kedalagudde et al. | |
| 2017/0302543 | A1 | 10/2017 | Wu et al. | |
| 2017/0318097 | A1* | 11/2017 | Drew | H04L 41/0806 |
| 2017/0353556 | A1* | 12/2017 | Seenappa | H04L 67/12 |
| 2018/0088977 | A1* | 3/2018 | Gray | H04L 41/0896 |
| 2018/0121222 | A1* | 5/2018 | Sharma | G06F 9/5077 |
| 2019/0334777 | A1* | 10/2019 | Chou | H04L 41/0823 |
| 2020/0028787 | A1* | 1/2020 | Mehra | H04L 47/25 |

FOREIGN PATENT DOCUMENTS

| | | |
|---|---|---|
| JP | 2015-194949 A | 11/2015 |
| JP | 2015-222481 A | 12/2015 |
| JP | 2016-144133 A | 8/2016 |
| WO | 2013/144747 A1 | 10/2013 |
| WO | 2015/131696 A1 | 9/2015 |
| WO | 2016/022698 A1 | 2/2016 |

OTHER PUBLICATIONS

"Network Functions Virtualisation (NFV); Management and Orchestration; Functional requirements specification", ETSI GS NFV-IFA010 V2.1.1, Apr. 2016, pp. 1-60.

International Search Report for PCT/JP2018/003106 dated Apr. 17, 2018 (PCT/ISA/210).

Communication dated Feb. 28, 2020, from the European Patent Office in European Application No. 18748519.8.

* cited by examiner

MANAGEMENT SYSTEM, MANAGEMENT APPARATUS, MANAGEMENT METHOD, AND PROGRAM

CROSS-REFERENCE TO RELATED APPLICATIONS

This application is a National Stage of International Application No. PCT/JP2018/003106 filed Jan. 31, 2018, claiming priority based on Japanese Patent Application No. 2017-017066 filed Feb. 1, 2017, the disclosure of which is incorporated herein in its entirety by reference.

FIELD

The present invention relates to a management system, a management apparatus, a management method, and a program.

BACKGROUND

The use of network function virtualisation (NFV) for virtualising functions of network equipment (such as routers, gateways, firewalls, and load balancers) has been increasing. In NFV, a function of network equipment is performed on a virtual machine, and thereby the virtual machine performs the function of the network equipment alternatively.

Non-Patent Literature 1 discloses a configuration for implementing NFV. In the configuration described in NPL 1, a network functions virtualisation orchestrator (NFVO), a virtualised network functions manager (VNFM), and a virtualised infrastructure manager (VIM) perform virtual resource management, virtualised network functions (VNF) lifecycle management, and the like. Specifically, the NFVO and the VNFM request the VIM to perform virtual resource management and/or VNF lifecycle management. The VIM then performs the virtual resource management and/or the VNF lifecycle management.

Patent Literature 1 describes a technique for performing VNF scale out in NFV environment. Specifically, in the technique described in Patent Literature 1, the VNFM includes a VNFM surplus resource information database (DB) to store surplus resource information of surplus resources, which are surplus virtual resources reserved in a VIM in advance. Upon receipt of notification that virtual resources are in short from the VNF, the VNFM identifies a virtual server with the reserved surplus resources, based on the surplus resource information stored in the VNFM surplus resource information DB, and transmits an instruction to provide the identified virtual server to the VIM. Upon receipt of the instruction to provide the virtual server from the VNFM, the VIM provides the virtual server.

Patent Literature 2 describes a technique for performing, even when switching of a plurality of virtual machines or the like has been performed by various control apparatuses, control for acquiring the latest data from a database. Specifically, in the technique described in Patent Literature 2, an NFVO stores delay information indicating synchronization delay between storages. A VNF accepts a transmission request from a mobile communication terminal. In response to the accepted transmission request, the VNF further accesses at least one database apparatus among a plurality of database apparatuses. The VNF further acquires the delay information from the NFVO and also receives a switching request. The VNF is triggered by the acceptance of the switching request to control for acquiring the latest data from the database apparatus, based on the delay information.

Patent Literature 1:
Japanese Patent Kokai Publication No. JP2015-194949A
Patent Literature 2:
Japanese Patent Kokai Publication No. JP2015-222481A
Non-Patent Literature 1:
"Network Functions Orchestration (NFV); Management and Orchestration; Functional requirements specification", ETSI GS NFV-IFA 010 V2.1.1 (2016-04), [online] searched on Dec. 28, 2016, the Internet <URL: http://www.etsi.org/deliver/etsi_gs/NFV-IFA/001_099/010/02.01.01_60/gs_NFV-IFA010v02010p.pdf>

SUMMARY

Note that the disclosures in the above-mentioned Patent Literatures and Non-Patent Literatures are incorporated herein by reference. The following analysis has been made from a viewpoint of the present invention.

Regarding the configuration described in Non-Patent Literature 1, the NFVO and the VNFM are not able to monitor and/or keep track of load of the VIM. For this reason, even when the VIM is overloaded, the NFVO and the VNFM transmit a signal for requesting processing to the VIM in some cases. Consequently, even when the VIM is in congestion, the NFVO and the VNFM transmit a signal for requesting processing to the VIM, which further increases the load of the VIM. The increase in load of the VIM may prevent the VIM for appropriately performing processing related to VNF lifecycle.

Patent Literatures 1 and 2 include no description about a case in which the VIM in congestion is not able to appropriately perform processing related to VNF lifecycle. Hence, in the techniques described in Patent Literatures 1 and 2, when the VIM is in congestion, the VIM may not be able to appropriately perform the processing related to VNF lifecycle.

In view of these, an object of the present invention is to provide a management system, a management apparatus, a management method, and a program that contribute to appropriately performing processing related to VNF lifecycle.

According to a first aspect, a management system is provided. The management system includes a first management node configured to instruct a second management node to perform processing for managing resources for a virtualised network function.

Moreover, the management system includes the second management node configured to perform, in response to an instruction from the first management node, the processing for managing the resources for virtualised network function.

In the management system, when the second management node is in congestion, at least one of the first management node and the second management node performs processing for suppressing communication traffic (amount) between the first management node and the second management node.

According to a second aspect, a management apparatus is provided. The management apparatus instructs a predetermined apparatus to perform processing for managing resources for a virtualised network function. Moreover, the management apparatus performs, when the predetermined apparatus is in congestion, processing for suppressing communication traffic between the predetermined apparatus and the management apparatus itself.

According to another aspect of the present invention, another management apparatus is provided. The management apparatus performs, in response to an instruction from a predetermined apparatus, processing for managing resources for a virtualised network function. Moreover, the management apparatus performs, when the management apparatus itself is in congestion, processing for suppressing communication traffic between the predetermined apparatus and the management apparatus itself.

According to a third aspect, a management method is provided, the management method being performed by a management system including a first management node configured to instruct a second management node perform processing for managing resources for a virtualised network function and the second management node configured to perform, in response to an instruction from the first management node, the processing for managing the resources for the virtualised network function.

The management method includes, when the second management node is in congestion, removing suppression of communication traffic between the first management node and the second management node.

Note that this method is associated with a particular machine called management node configured to manage resources for a virtualised network function.

According to a fourth aspect, a program is provided, the program being executed by a management system including a first management node configured to instruct a second management node to perform processing for managing resources for a virtualised network function and the second management node configured to perform, in response to an instruction from the first management node, the processing for managing the resources for the virtualised network function.

The management program causes the management system to perform, when the second management node is in congestion, processing for suppressing communication traffic between the first management node and the second management node.

Note that this program may be recoded on a computer-readable storage medium. The storage medium may be a non-transient medium, such as a semiconductor memory, a hard disk, a magnetic recording medium, or an optical recording medium. The present invention may be implemented as a computer program product.

According to each of the aspects, a management system, a management apparatus, a management method, and a program that contribute to appropriately performing processing related to VNF lifecycle are provided.

MODES

Figure 1:
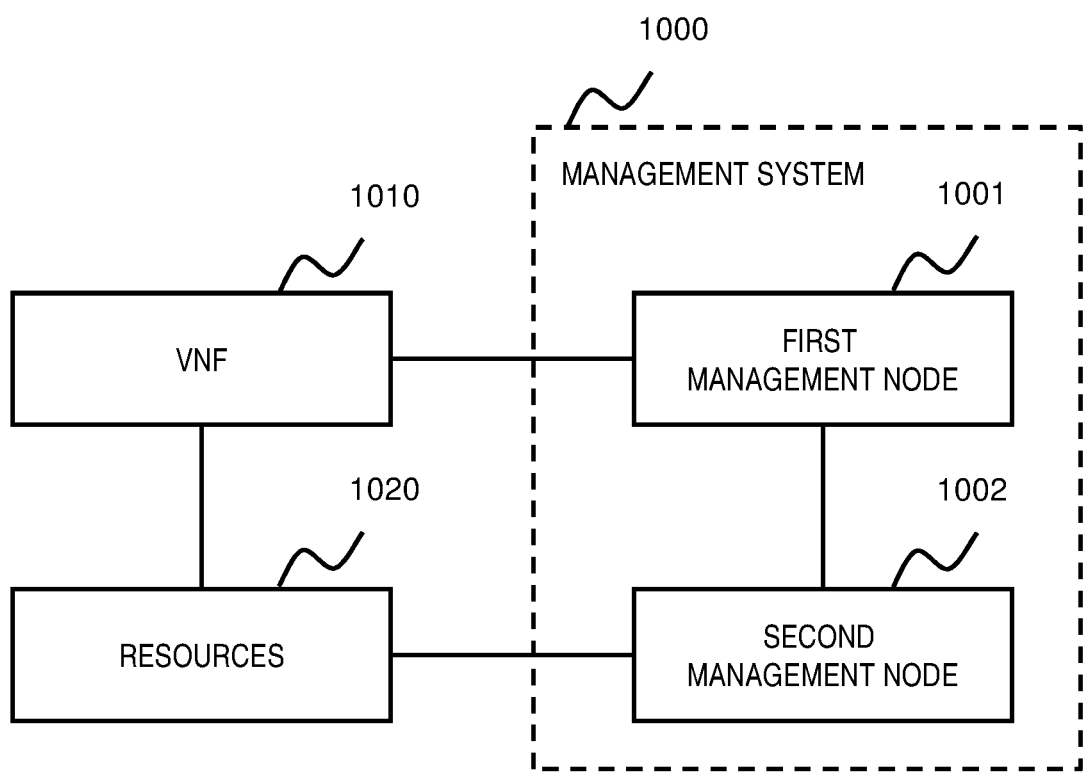
FIG. 1 is a diagram for illustrating an outline of one example embodiment.

First of all, with reference to FIG. 1, an outline of one example embodiment is described. Note that the reference signs in the drawings added in this outline are given, as an example, to elements for convenience for the sake of better understanding, and the description of this outline is not intended to provide any particular limitation. Connecting lines between the blocks in each block diagram include both bidirectional and unidirectional connecting lines. Note that an input/output port or an interface is provided at each connection portion of each connecting line although explicit illustration thereof is omitted.

As described above, a management system, a management apparatus, a management method, and a program that contribute to appropriately performing processing related to VNF lifecycle are desired.

In view of this, a management system 1000 illustrated in FIG. 1 is provided as an example. The management system 1000 includes a first management node 1001 and a second management node 1002.

The first management node 1001 instructs the second management node 1002 to perform processing for managing resources 1020 for a virtualised network function (VNF) 1010.

In response to the instruction from the first management node 1001, the second management node 1002 performs the processing for managing the resources 1020 for the VNF 1010. Specifically, in a case that the VNF 1010 is created, updated, terminated, or the like, the second management node 1002 performs processing such as securing, allocating, releasing, or the like of the resources for the VNF 1010.

When the second management node 1002 is in congestion, at least one of the first management node 1001 and the second management node 1002 performs processing for suppressing communication traffic between the first management node 1001 and the second management node 1002. Suppressing communication traffic between the first management node 1001 and the second management node 1002 reduces load of the second management node 1002 and hence easing the congestion. For example, the first management node 1001 reduces requests (instructions) from the first management node 1001 to the second management node 1002, which thereby suppresses the communication traffic (amount) between the first management node 1001 and the second management node 1002.

When the second management node 1002 is in congestion, the second management node 1002 may not be able to appropriately manage the resources 1020 for the VNF 1010. The second management node 1002 being not able to appropriately manage the resources 1020 for the VNF 1010 may cause a failure in performing processing related to VNF lifecycle.

However, by suppressing communication traffic between the first management node 1001 and the second management node 1002, the congestion of the second management node 1002 can be eased. Consequently, the second management node 1002 is able to appropriately manage the resources 1020 for the VNF 1010. The second management node 1002 appropriately managing the resources 1020 for the VNF 1010 consequently contributes to preventing a failure in performing the processing related to VNF lifecycle.

Hence, the management system 1000 contributes to appropriately performing the processing related to VNF lifecycle.

First Example Embodiment

A first example embodiment is described in more detail by using drawings.

Figure 2:
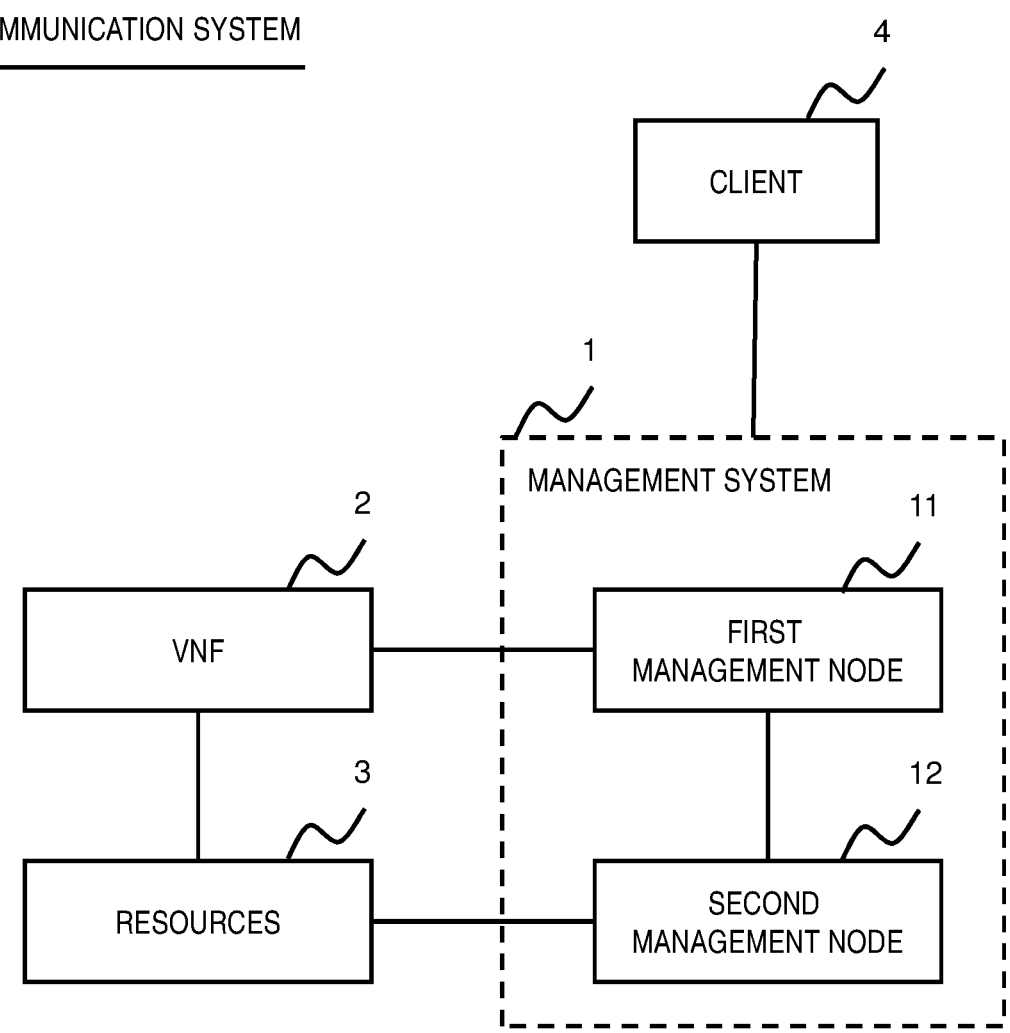
FIG. 2 is a block diagram illustrating an example of an entire configuration of a communication system 10.

FIG. 2 is a block diagram illustrating an example of an entire configuration of a communication system 10 according to the present example embodiment. The communication system 10 according to the present example embodiment includes a management system 1, a virtualised network function (VNF) 2, and resources 3 for controlling performance of the VNF 2. The management system 1 includes a first management node 11 and a second management node 12.

The VNF 2 is a unit implementing a network function that is virtualised. For example, the VNF 2 may be a function of network equipment, such as a router, a gateway, a firewall, or a load balancer, implemented in a virtualised environment.

The resources 3 are a virtual machine and hardware, configured to implement and control the VNF 2. The virtual machine performs processing in a virtualised environment to implement and control the VNF 2.

The management system 1 manages the lifecycle of the VNF 2, based on an instruction from a client 4. The lifecycle of the VNF 2 includes processing such as creation, update, and termination of the VNF 2.

The client 4 is, for example, a terminal apparatus used by a maintenance worker of the management system 1, a host apparatus of the management system 1, or the like.

The first management node 11 instructs the second management node 12 to perform processing for managing the resources for the VNF 2. In other words, the first management node 11 instructs the second management node 12 to perform processing for managing the resources 3.

In response to the instruction from the first management node 11, the second management node 12 performs the processing for managing the resources for the VNF 2 (i.e., the resources 3).

When the second management node 12 is in congestion, at least one of the first management node 11 and the second management node 12 performs processing for suppressing communication traffic between the first management node 11 and the second management node 12. When the congestion of the second management node 12 is solved, at least one of the first management node 11 and the second management node 12 removes the suppression of the communication traffic between the first management node 11 and the second management node 12.

Figure 3:
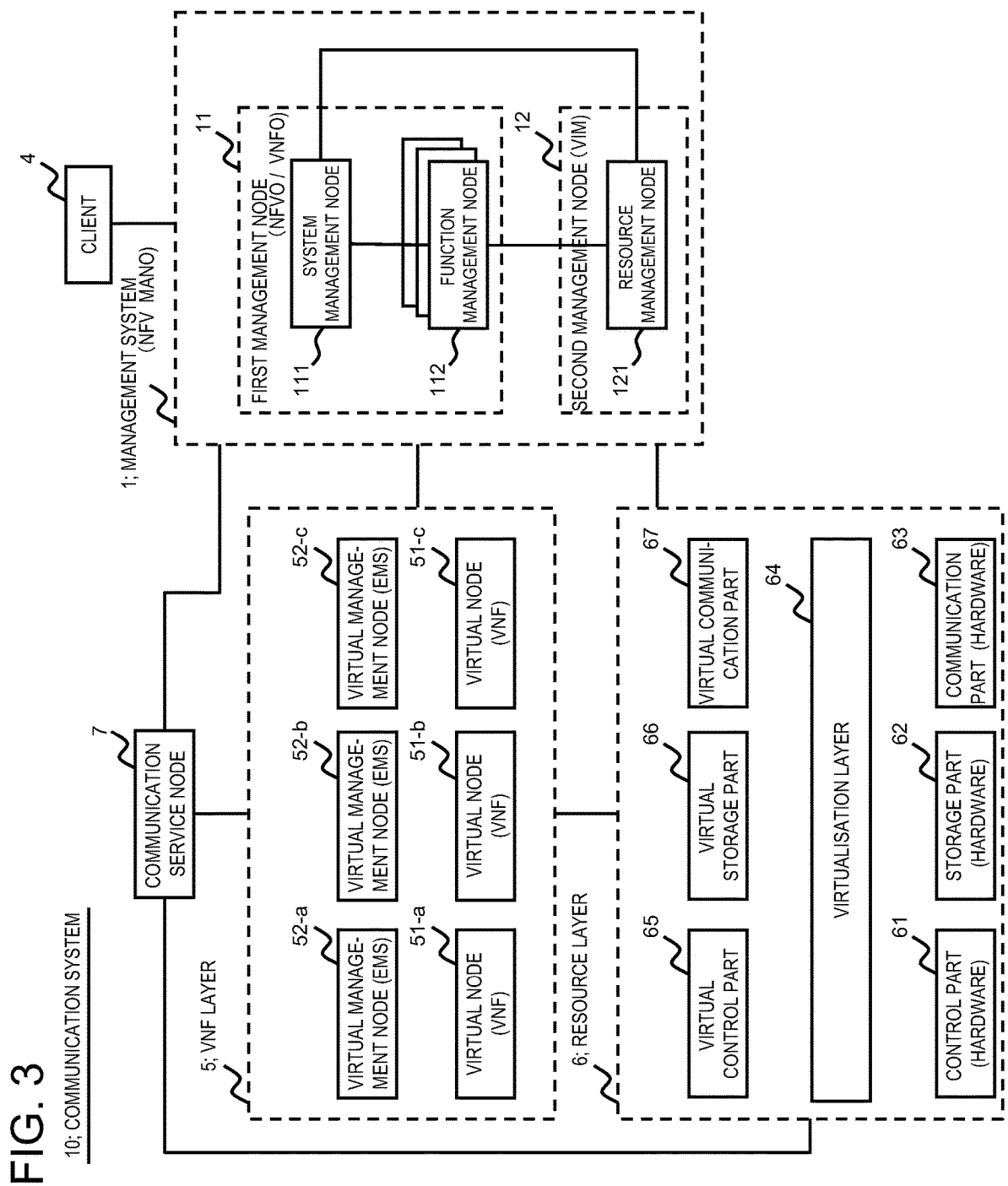
FIG. 3 is a block diagram illustrating an example of an inner configuration of the communication system 10.

Next, with reference to FIG. 3, the communication system 10 according to the present example embodiment is described in further detail.

FIG. 3 is a block diagram illustrating an example of an inner configuration of the communication system 10 according to the present example embodiment.

With reference to FIG. 3, the communication system 10 according to the present example embodiment includes the management system 1, a VNF layer 5, and a resource layer 6. The VNF layer 5 implements the VNF 2 illustrated in FIG. 2. The resource layer 6 implements the resources 3 illustrated in FIG. 2. The management system 1, the VNF layer 5, and the resource layer 6 communicate with a communication service node 7. Note that FIG. 3 is an example of the communication system 10 according to the present example embodiment and is not intended to limit the communication system 10 according to the present example embodiment to the configuration illustrated in FIG. 3.

(VNF Layer 5)

First, the VNF layer 5 is described in detail.

The VNF layer 5 includes virtual nodes (VNFs) (51-*a* to 51-*c*) and virtual management nodes (element management systems (EMSs)) (52-*a* to 52-*c*). Note that, in the following description, the virtual nodes (VNFs) (51-*a* to 51-*c*) are referred to as a virtual node (VNF) 51, and the virtual management nodes (EMSs) (52-*a* to 52-*c*) are referred to as a virtual management node (EMS) 52, when there is no need for distinction. Moreover, in FIG. 3, three virtual nodes (VNFs) (51-*a* to 51-*c*) and three virtual management nodes (EMSs) (52-*a* to 52-*c*) are illustrated. However, this does not intend to limit each of the number of the virtual nodes (VNFs) 51 and the number of virtual management nodes (EMSs) 52 to three.

By configuring (implementing) the virtual node (VNF) 51 with a network function, the virtual node (VNF) 51 implements a VNF. The virtual machine performs the network function configured in the virtual node (VNF) 51 by using the virtual node (VNF) 51 configured with the network function. Note that one virtual node (VNF) 51 may, of course, correspond to two or more virtual machines. Moreover, one virtual machine may, of course, use two or more virtual nodes (VNFs) 51.

The virtual management node (EMS) 52 manages the virtual node (VNF) 51. Specifically, the virtual management node (EMS) 52 manages the network function configured in the virtual node (VNF) 51. Each virtual management node (EMS) 52 may manage one virtual node (VNF) 51. Alternatively, one virtual management node (EMS) 52 may manage two or more virtual nodes (VNFs) 51.

(Resource Layer 6)

Next, the resource layer 6 is described in detail.

The resource layer 6 includes a control part (hardware) 61, a storage part (hardware) 62, a communication part (hardware) 63, a virtualisation layer 64, a virtual control part 65, a virtual storage part 66, and a virtual communication part 67.

The virtual machine includes the virtual control part 65, the virtual storage part 66, and the virtual communication part 67. Here, the resource layer 6 may include two or more virtual machines. Note that, in the following description, the control part (hardware) 61, the storage part (hardware) 62, and the communication part (hardware) 63 are also referred to simply as "hardware" when there is no need for distinction. Moreover, in the following description, the virtual control part 65, the virtual storage part 66, and the virtual communication part 67 are also referred to simply as a "virtual machine" when there is no need for distinction.

The control part (hardware) 61 is configured to control an information processing apparatus (computer) constituting the resource layer 6. For example, the control part (hardware) 61 is implemented with a central processing unit (CPU) and the like.

The storage part (hardware) 62 is configured to store information necessary for causing the information processing apparatus constituting the resource layer 6 to operate. For example, the storage part (hardware) 62 is implemented with a magnetic disk apparatus, an optical disk apparatus, or a semiconductor memory.

The communication part (hardware) 63 is configured to control communication processing of the control part (hardware) 61 and the storage part (hardware) 62 with the virtual machine, the management system 1, the communication service node 7, the client 4, and the like. The communication part (hardware) 63 is configured to also control communication processing with a network different from the communication system 10 according to the present example embodiment. For example, the communication part (hardware) 63 is implemented with a network interface card (NIC) or the like.

The virtualisation layer 64 is configured to perform processing for abstracting hardware. The virtualisation layer 64 is configured to further relay connection between the hardware and the virtual machine and the VNF. In other words, the hardware accesses the virtual machine and the VNF via the virtualisation layer 64 to perform processing configured in the virtual machine and the VNF.

The virtual control part 65 performs the VNF configured in the virtual node 51. The virtual storage part 66 stores information necessary for performing the VNF. The virtual communication part 67 controls communication processing with the management system 1, the communication service node 7, the client 4, and the like.

(Communication Service Node 7)

The communication service node 7 provides communication service. For example, a communication provider manages the communication service node 7. For example, the communication service node 7 may function as an operations support systems and business support systems (OSS/BSS) defined in the ETSI NFV standards (Non-Patent Literature 1).

(Management System 1)

Next, the management system 1 is described in detail.

The management system 1 includes the first management node 11 and the second management node 12. The first management node 11 includes a system management node 111 and one or two or more function management nodes 112. The second management node 12 includes a resource management node 121.

The system management node 111 accepts an instruction of VNF creation or the like from the client 4. When the system management node 111 accepts the instruction of VNF creation or the like from the client 4, the system management node 111 inquires the function management node 112 managing a target VNF about whether or not the instructed processing is possible. When the instructed processing is possible to be performed, the system management node 111 instructs the resource management node 121 to perform processing for securing resources necessary for the target VNF.

Each function management node 112 manages VNF lifecycle. The function management node 112 may be provided in the management system 1 for each VNF. Alternatively, one resource management node 121 may manage lifecycles of two or more VNFs.

In response to a request from the system management node 111, the function management node 112 determines whether or not the processing related to VNF lifecycle is possible. The function management node 112 then responds to the system management node 111 about whether or not the processing related to VNF lifecycle is possible. The function management node 112 instructs the resource management node 121 to perform processing for allocating resources to the target VNF. Furthermore, the function management node 112 performs the processing related to VNF lifecycle, such as VNF creation.

The resource management node 121 performs processing for managing resources for a VNF. Specifically, in response to an instruction from the system management node 111, the resource management node 121 performs the processing for securing resources necessary for a target VNF. In response to the instruction from the function management node 112, the resource management node 121 performs the processing for allocating resources to the target VNF.

Here, when the resource management node 121 is in congestion, the resource management node 121 secures, for the target VNF, VNF resources with a functional configuration smaller than a requested functional configuration. The resource management node 121 then allocates the resources smaller than the resources for the requested functional configuration, to the target VNF.

In contrast, when the congestion of the resource management node 121 is solved, the resource management node 121 secures, for the target VNF, VNF resources satisfying the originally requested functional configuration. The resource management node 121 then allocates the resources satisfying the originally requested functional configuration, to the target VNF.

For example, the system management node 111 may be implemented as an orchestrator defined in the ETSI NFV standards (Non-Patent Literature 1). For example, the function management node 112 may be implemented as a VNF manager defined in the ETSI NFV standards. For example, the resource management node 121 may be implemented as a virtualised infrastructure manager (VIM) defined in the ETSI NFV standards.

Next, operations of the communication system 10 according to the present example embodiment are described in detail with reference to FIGS. 4, 5, and 6. Note that, although VNF instantiation processing is described as an example in the following description, this does not intend to limit processing of the management system 1 according to the present example embodiment to the VNF instantiation processing. The processing in the management system 1 according to the present example embodiment may be applied to VNF scale out processing and healing processing. The operations of the communication system 10 to be described below are examples of the communication system 10 according to the present example embodiment, and the description is not intended to limit operations of the communication system 10 to the operations to be described below.

Figure 4:
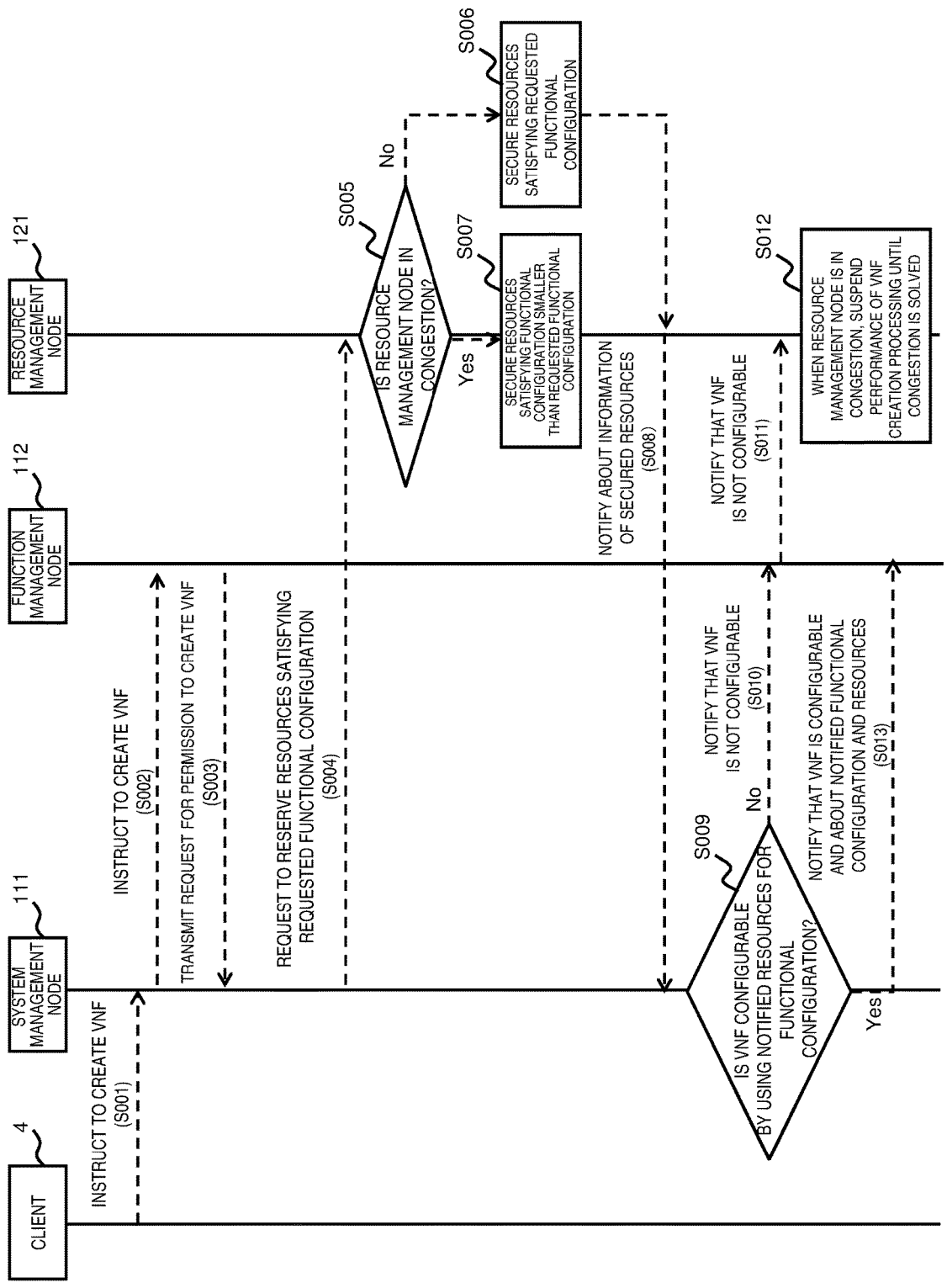
FIG. 4 is a sequence diagram illustrating an example of operations of a communication system 10 according to a first example embodiment.
Figure 5:
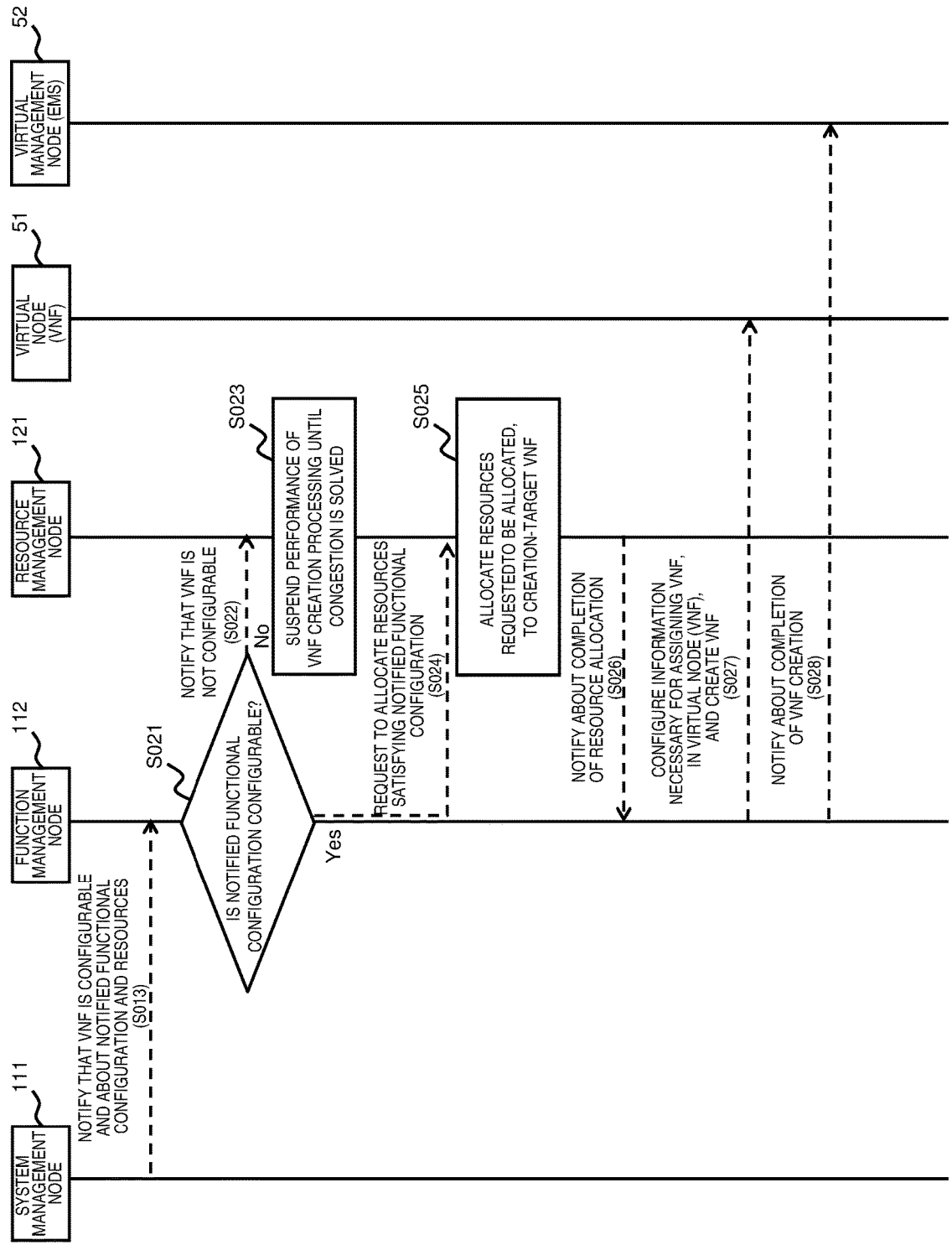
FIG. 5 is a sequence diagram illustrating the example of the operations of the communication system 10 according to the first example embodiment.
Figure 6:
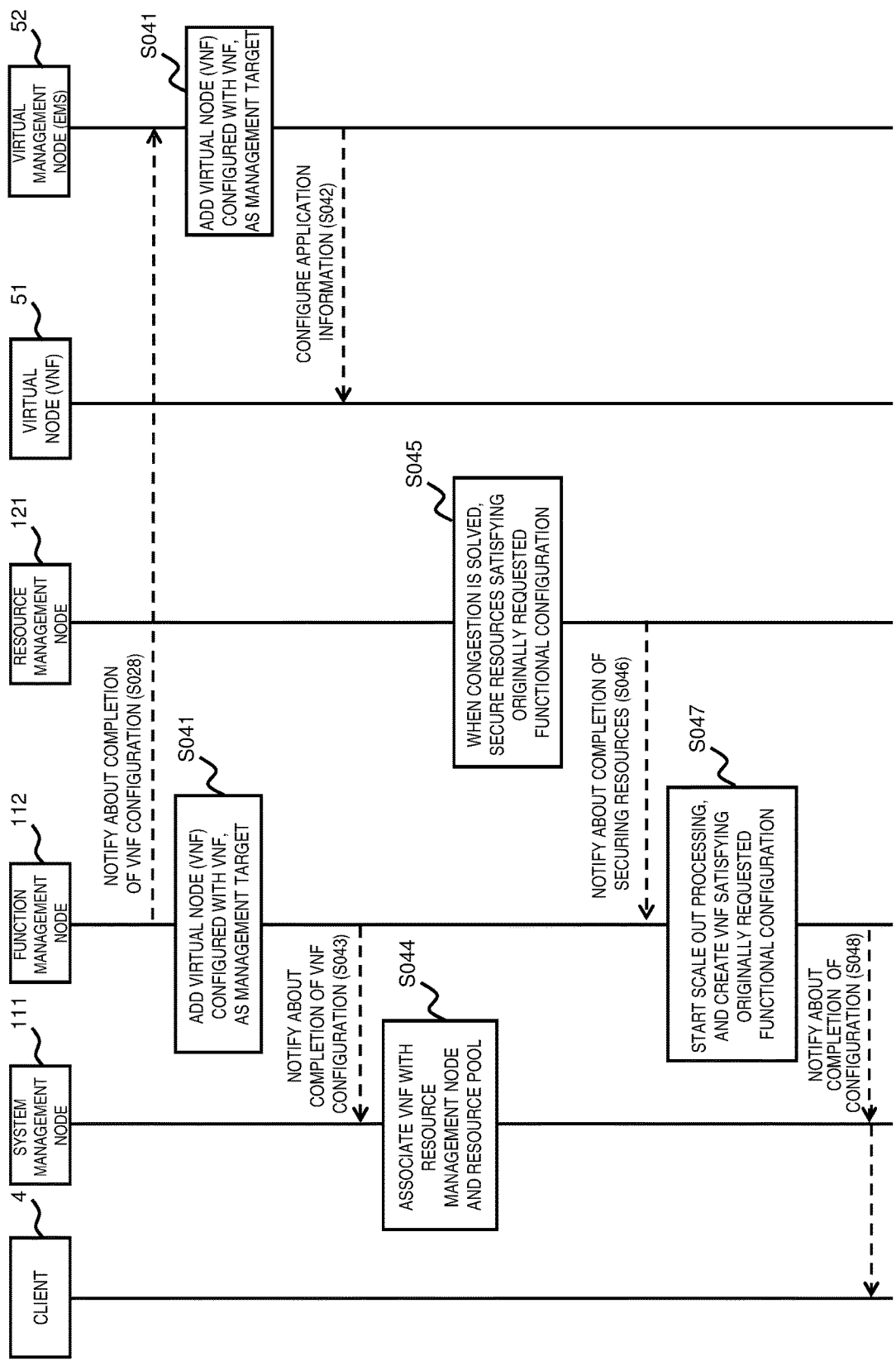
FIG. 6 is a sequence diagram illustrating the example of the operations of the communication system 10 according to the first example embodiment.

FIGS. 4, 5, and 6 are sequence diagrams illustrating examples of the operations of the communication system 10 according to the present example embodiment.

With reference to FIG. 4, in Step S001, the client 4 instructs the system management node 111 to create a VNF.

Upon receipt of a VNF creation instruction from the client 4, the system management node 111 instructs the function management node 112 to create the VNF (Step S002). Specifically, the system management node 111 instructs the function management node 112 that manages the VNF for which creation is instructed, to create the VNF.

In Step S003, the function management node 112 transmits a request for permission to create the VNF to the system management node 111. Here, the request for permission to create the VNF includes a functional configuration implementing the creation-target VNF and information of resources satisfying the functional configuration.

In Step S004, the system management node 111 requests the resource management node 121 to reserve the resources satisfying the requested functional configuration.

In Step S005, the resource management node 121 determines whether or not the resource management node 121 is in congestion. When the resource management node 121 is not in congestion (No at branch in Step S005), the resource management node 121 secures the resources satisfying the requested functional configuration (Step S006). Then, the processing advances to Step S008.

In contrast, when the resource management node 121 is in congestion (Yes at branch in Step S005), the resource management node 121 secures resources satisfying a functional configuration smaller than the requested functional configuration (Step S007). Here, the smaller the size of the resources to be secured by the resource management node 121 is, the smaller the load of the resource management node 121 is in the processing for securing the resources.

In Step S008, the system management node 111 is notified of information of the secured resources.

In Step S009, the system management node 111 determines whether or not the VNF is configurable by using the resources with the notified functional configuration (Step S009). When the VNF is not configurable by using the resources with the notified functional configuration (No at branch in Step S009), the system management node 111 notifies, via the function management node 112, the resource management node 121 that the VNF is not configurable (Steps S010 and S011). Then, when the resource management node 121 is in congestion, the resource management node 121 suspends performance of the VNF creation processing until the congestion is solved (Step S012).

In contrast, when the VNF is configurable by using the resources with the notified functional configuration (Yes at branch in Step S009), the system management node 111 notifies the function management node 112 that the VNF is configurable and about the notified functional configuration and resources (Step S013). Then, the processing advances to Step S021 illustrated in FIG. 5.

Next, the description of the operations of the communication system 10 according to the present example embodiment continues with reference to FIG. 5.

In Step S021, the function management node 112 determines whether or not the notified functional configuration is configurable. In a case that the notified functional configuration is not configurable (No at branch in Step S021), the function management node 112 notifies the resource management node 121 that the VNF is not configurable (Step S022). Then, the resource management node 121 suspends performance of the VNF creation processing until the congestion is solved (Step S023).

In contrast, in a case that the notified functional configuration is configurable (Yes at branch in Step S021), the function management node 112 requests to allocate resources satisfying the notified functional configuration (Step S024). Specifically, the function management node 112 requests to allocate the resources secured by the resource management node 121 in Step S007 to the creation-target VNF. Here, the smaller the size of the resources requested to be allocated is, the smaller the communication traffic between the function management node 112 and the resource management node 121 is. In other words, the smaller the size of the resources requested to be allocated is, the smaller the communication load of the resource management node 121 is.

In Step S025, the resource management node 121 allocates the resources requested to be allocated, to the creation-target VNF. Specifically, the resource management node 121 allocates the resources secured in Step S007 to the creation-target VNF. Here, the smaller the size of the resources to be allocated is, the smaller the load of the resource management node 121 is in the processing for allocating the resources.

In Step S026, the resource management node 121 notifies the function management node 112 of completion of the resource allocation. Upon receipt of the notification of the completion of the resource allocation, the function management node 112 configures, in the virtual node (VNF) 51, information necessary for assigning the VNF and creates the VNF (Step S027). The function management node 112 then notifies the virtual management node (EMS) 52 of completion of the VNF creation (Step S028). Then, the processing advances to Step S041 illustrated in FIG. 6.

Next, the description of the operations of the communication system 10 according to the present example embodiment continues with reference to FIG. 6.

When the function management node 112 notifies the virtual management node (EMS) 52 of completion of VNF configuration, the function management node 112 and the virtual management node (EMS) 52 add the virtual node (VNF) 51 configured with the VNF, as a management target (Step S041).

The virtual management node (EMS) 52 then configures application information in the virtual node (VNF) 51 (Step S042). Here, the application information is information of an application that causes the VNF to operate or the like. The function management node 112 notifies the system management node 111 of completion of the VNF configuration (Step S043). The system management node 111 then associates the VNF with the resource management node 121 and a resource pool (Step S044).

Next, a case in which the congestion is solved in the resource management node 121 is described.

When the congestion is solved, the resource management node 121 secures the resources satisfying the originally requested functional configuration (functional configuration requested in Step S004) (Step S045). The resource management node 121 then notifies the function management node 112 of completion of the resource securing (Step S046). The function management node 112 then starts scale out processing to create the VNF that satisfies the originally requested functional configuration (Step S047).

Then, in Step S048, the function management node 112 notifies, via the system management node 111, the client 4 of completion of the configuration.

As described above, in the management system 1 according to the present example embodiment, when the resource management node 121 is in congestion, VNF resources with a functional configuration smaller than a requested functional configuration are secured. Consequently, load of the resource management node 121 is reduced. Moreover, the smaller the size of VNF resources to be secured is, the more the communication traffic between the function management node 112 and the resource management node 121 is reduced. Consequently, the management system 1 according to the present example embodiment eases congestion of the resource management node 121 and thereby contributes to preventing a failure in performing the processing related to VNF lifecycle. Hence, the management system 1 according to the present example embodiment contributes to appropriately performing the processing related to VNF lifecycle.

Second Example Embodiment

Next, a second example embodiment is described in detail by using the drawings.

The present example embodiment is a mode in which, when a node configured to manage VNF resources is in congestion, a management system suspends, after accepting a request for processing related to VNF lifecycle, performance of the processing. Note that descriptions of parts overlapping those in the above-described example embodiment are omitted in the description of the present example embodiment. Furthermore, the same constituent components as those in the above-described example embodiment are denoted by the same reference signs, and descriptions thereof are omitted, in the description of the present example embodiment. Moreover, descriptions of the same advantageous effects as those in the above-described example embodiment are also omitted in the description of the present example embodiment.

An entire configuration of a communication system 10 according to the present example embodiment is as illustrated in FIG. 2. An inner configuration of the communication system 10 according to the present example embodiment is as illustrated in FIG. 3.

In a management system 1 according to the present example embodiment, when a resource management node 121 is in congestion, a first management node 11 (system management node 111 and function management node 112) suspends performance of VNF management processing until the congestion is solved. In other words, when the resource management node 121 is in congestion, the first management node 11 (system management node 111 and function management node 112) performs processing for suppressing communication between the first management node 11 and the resource management node 121.

Specifically, when the resource management node 121 in congestion receives a signal (request for processing related to VNF lifecycle) from the system management node 111 or the function management node 112, the resource management node 121 responds that the resource management node 121 is in congestion. The transmission source of the signal (i.e., the system management node 111 or the function management node 112) then suppresses subsequent signal transmission and suspends performance of the processing related to VNF lifecycle.

The system management node 111 then notifies the requester of the processing related to VNF lifecycle that the resource management node 121 is in congestion and that performance of the processing related to VNF lifecycle is suspended.

In contrast, when the congestion of the resource management node 121 is solved, the system management node 111 and the function management node 112 start performance of VNF management processing.

Specifically, when the congestion of the resource management node 121 is solved, the resource management node 121 notifies the system management node 111 or the function management node 112 that the congestion of the resource management node 121 is solved.

The system management node 111 or the function management node 112 thereby recognizes that the congestion of the resource management node 121 is solved and resumes (starts) the suspended processing related to VNF lifecycle.

The system management node 111 then notifies the requester of the processing related to VNF lifecycle that the congestion of the resource management node 121 is solved and that the processing related to VNF lifecycle is resumed (started).

Next, operations of the communication system 10 according to the present example embodiment are described in detail with reference to FIGS. 7 to 9.

Figure 7:
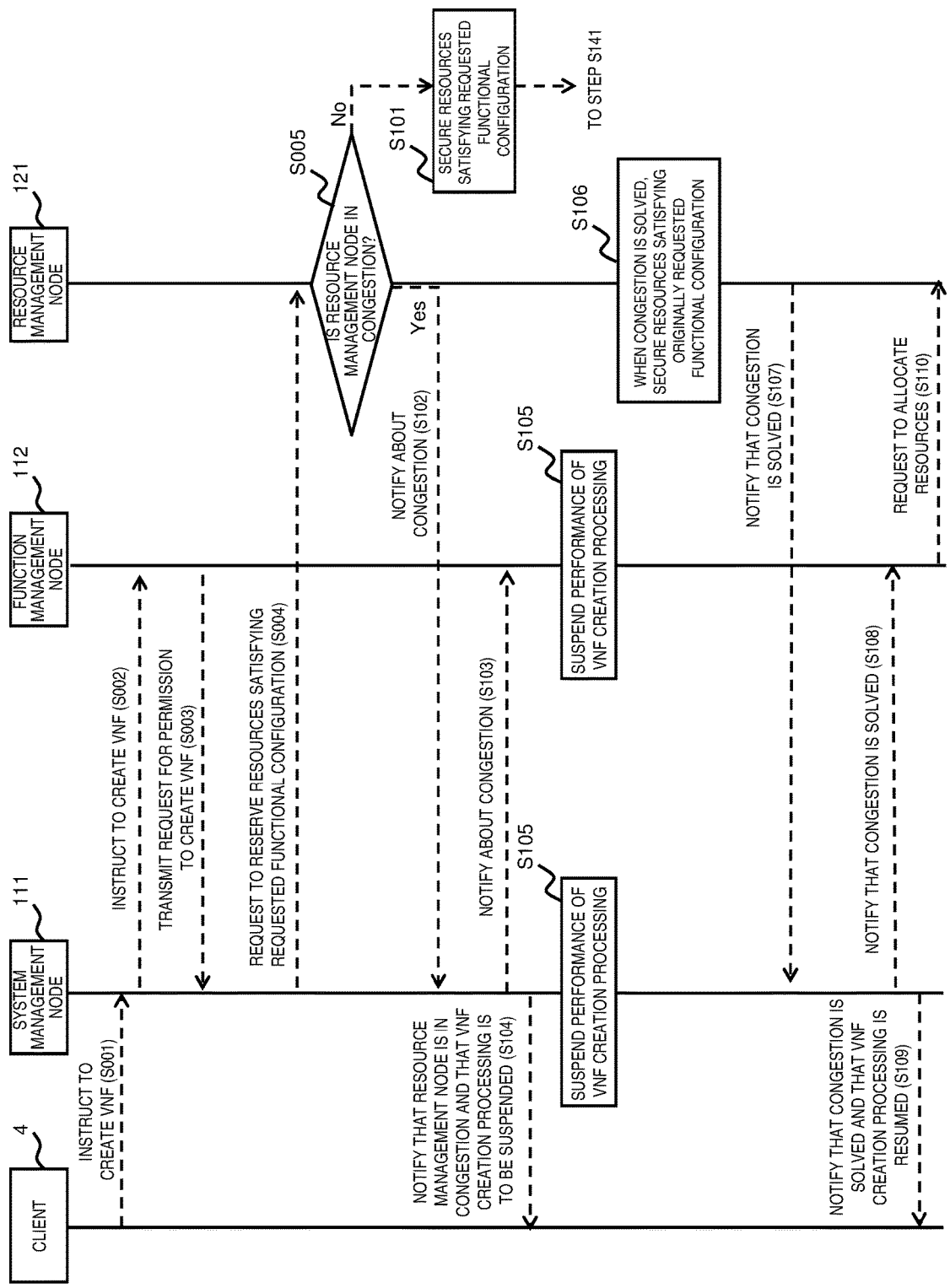
FIG. 7 is a sequence diagram illustrating an example of operations of a communication system 10 according to a second example embodiment.
Figure 8:
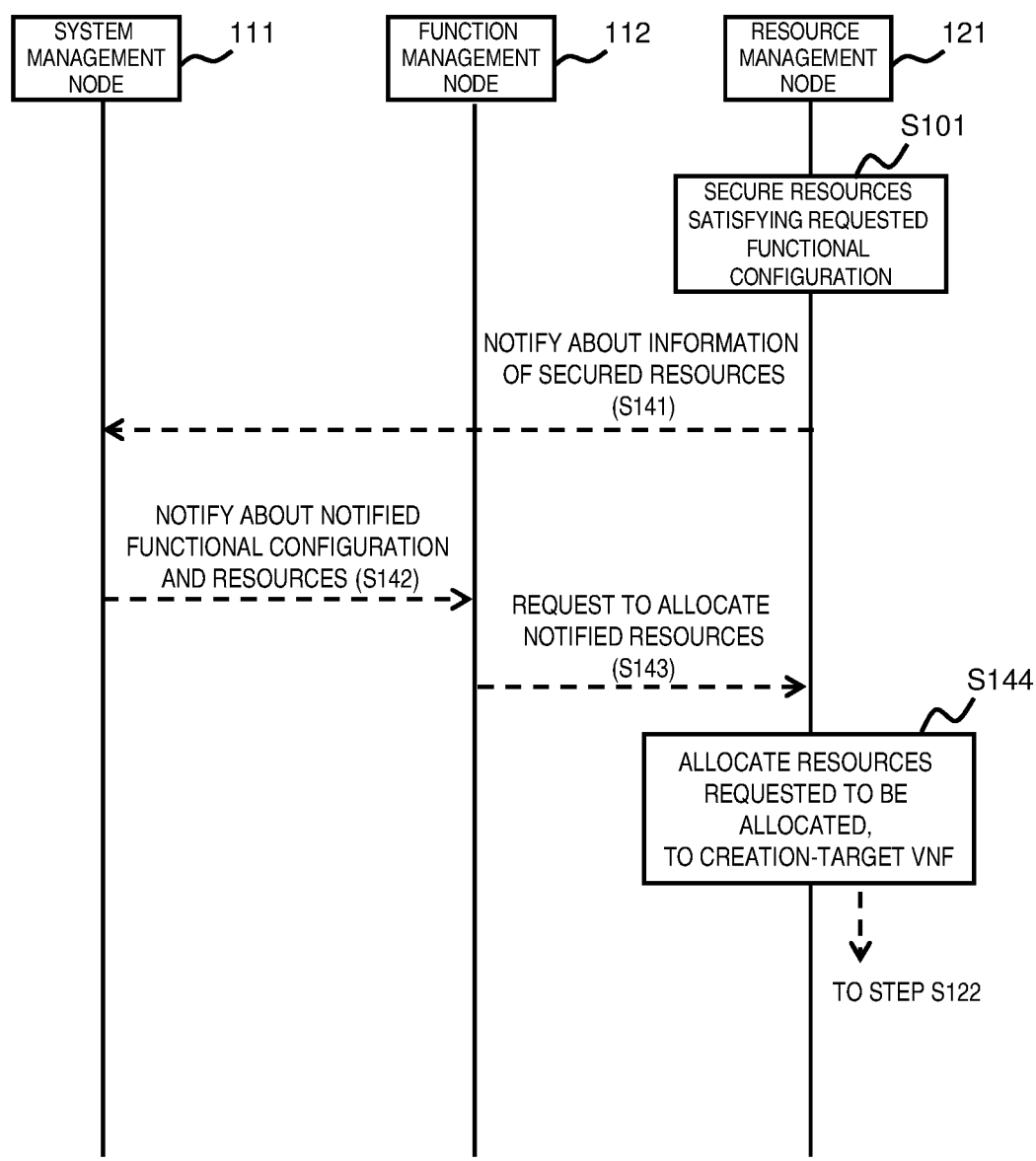
FIG. 8 is a sequence diagram illustrating the example of the operations of the communication system 10 according to the second example embodiment.
Figure 9:
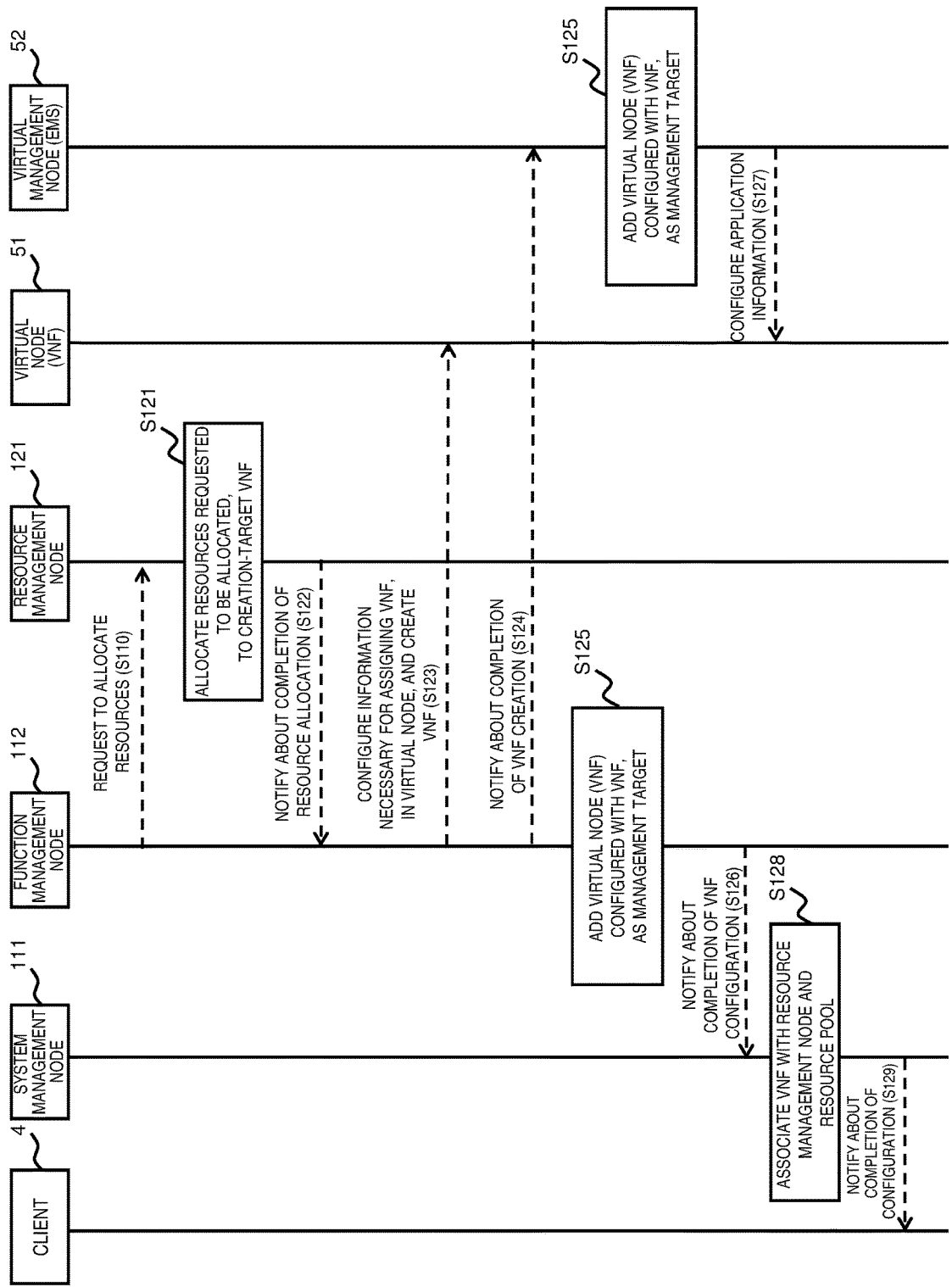
FIG. 9 is a sequence diagram illustrating the example of the operations of the communication system 10 according to the second example embodiment.

FIGS. 7, 8, and 9 are sequence diagrams illustrating examples of the operations of the communication system 10 according to the present example embodiment. Note that, although VNF instantiation processing is described as an example in the following description, this does not intend to limit processing of the management system 1 according to the present example embodiment to the VNF instantiation processing. The processing in the management system 1 according to the present example embodiment may be applied to VNF scale out processing and healing processing. The operations of the communication system 10 to be described below are examples of the communication system 10 according to the present example embodiment, and the description is not intended to limit operations of the communication system 10 to the operations to be described below. Note that the processing in Step S001 to Step S004 illustrated in FIG. 7 is similar to the processing in Step S001 to Step S004 illustrated in FIG. 4, and hence detailed descriptions thereof are omitted.

When the resource management node 121 accepts a request to reserve resources from the system management node 111, the resource management node 121 determines whether or not the resource management node 121 is in congestion (Step S005 illustrated in FIG. 7). When the resource management node 121 is not in congestion (No at branch in Step S005), the resource management node 121 secures the resources satisfying the requested functional configuration (Step S101). Then, the processing advances to Step S141 illustrated in FIG. 8.

Here, with reference to FIG. 8, a case in which the resource management node 121 is not in congestion is described.

When the resource management node 121 secures the resources satisfying a requested functional configuration (Step S101), the resource management node 121 notifies the system management node 111 of information of the secured resources (Step S141). The system management node 111 then notifies the function management node 112 of the notified functional configuration and resources (Step S142). The function management node 112 requests the resource management node 121 to allocate the notified resources (Step S143). The resource management node 121 allocates the resources requested to be allocated, to the creation-target VNF (Step S144). Then, the processing advances to Step S122 illustrated in FIG. 9.

Again, with reference to FIG. 7, a case in which the resource management node 121 is in congestion is described. When the resource management node 121 is in congestion (Yes at branch in Step S005), the resource management node 121 notifies the system management node 111 of the congestion (Step S102). The system management node 111 then notifies the function management node 112 of the congestion (Step S103). The system management 111 further notifies the client 4 that the resource management node 121 is in congestion and that the VNF creation processing is to be suspended (Step S104). Note that the system management node 111 may notify the function management node 112, after notifying the client 4, that the resource management node 121 is in congestion, and thus the notifications may be made in any order.

The system management node 111 and the function management node 112 suspend performance of the VNF creation processing (Step S105).

Next, a case in which the congestion is solved in the resource management node 121 is described.

When the congestion is solved, the resource management node 121 secures the resources satisfying the originally requested functional configuration (the functional configuration requested in Step S004) (Step S106). The resource management node 121 then notifies the system management node 111 that the congestion is solved (Step S107). The system management node 111 then notifies the function management node 112 that the congestion is solved (Step S108). The system management node 111 then notifies the client 4 that the congestion is solved and that the VNF creation processing is to be resumed (Step S109). Note that the system management node 111 may notify the function management node 112, after notifying the client 4, that the resource management node 121 is in congestion, and thus the notifications may be made in any order.

In Step S110, the function management node 112 requests the resource management node 121 to allocate the resources. Then, the processing advances to Step S121 illustrated in FIG. 9.

In Step S121 illustrated in FIG. 9, the resource management node 121 allocates the resources requested to be allocated, to the creation-target VNF. The processing in Step S122 to Step S124 illustrated in FIG. 9 is similar to the processing in Step S026 to Step S028 illustrated in FIG. 5, and hence detailed descriptions thereof are omitted below. Furthermore, the processing in Step S125 to Step S128 illustrated in FIG. 9 is similar to the processing in Step S041 to Step S044 illustrated in FIG. 6, and hence detailed descriptions thereof are omitted.

When the system management node 111 associates the VNF with the resource management node 121 and a resource pool (Step S128), the system management node 111 notifies the client 4 of completion of the configuration (Step S129).

As described above, when the resource management node 121 is in congestion, the management system 1 according to the present example embodiment suspends, after accepting a request for processing related to VNF lifecycle, performance of the processing. The resource management node 121 suspending performance of the processing stops performance and request of processing in subsequent steps. Consequently, the management system 1 according to the present example embodiment eases congestion of the resource management node 121 and thereby contributes to preventing a failure in performing the processing related to VNF lifecycle. Hence, the management system 1 according to the present example embodiment contributes to appropriately performing the processing related to VNF lifecycle.

Third Example Embodiment

Next, a third example embodiment is described in detail by using drawings.

The present example embodiment is a mode in which, when a node configured to manage VNF resources is in congestion, a management system reserves, after accepting a request for processing related to VNF lifecycle, performance of the processing and suspends the performance of the processing related to VNF lifecycle. Note that descriptions of parts overlapping those in the above-described example embodiments are omitted in the description of the present example embodiment. Furthermore, the same constituent components as those in the above-described example embodiments are denoted by the same reference signs, and descriptions thereof are omitted, in the description of the present example embodiment. Moreover, descriptions of the same advantageous effects as those in the above-described example embodiments are also omitted in the description of the present example embodiment.

An entire configuration of a communication system 10 according to the present example embodiment is as illustrated in FIG. 2. An inner configuration of the communication system 10 according to the present example embodiment is as illustrated in FIG. 3.

In a management system 1 according to the present example embodiment, when a resource management node 121 is in congestion and processing for managing VNF resources is instructed by a first management node 11 (system management node 111 and function management node 112), the resource management node 121 reserves performance of the instructed processing and suspends the performance of the instructed processing until the congestion is solved.

Specifically, when the resource management node 121 receives a signal (request for processing related to VNF lifecycle) from the first management node 11 (system management node 111 and function management node 112) in congestion, the resource management node 121 accepts the request for the processing and reserves performance of the processing. The resource management node 121 then responds that the performance of the processing is reserved. The resource management node 121 then suspends processing in subsequent steps. The system management node 111 then notifies the requester of the processing related to VNF lifecycle that the performance of the processing related to VNF lifecycle is suspended.

In contrast, when the congestion of the resource management node 121 is solved, the system management node 111 and the function management node 112 start performance of VNF management processing.

Specifically, when the congestion of the resource management node 121 is solved, the resource management node 121 performs VNF resource allocation. The resource management node 121 then resumes (starts) the suspended processing related to VNF lifecycle. The first management node 11 (system management node 111 and function management node 112) also resumes (starts) the suspended processing related to VNF lifecycle. When the processing related to VNF lifecycle is completed, the system management node 111 notifies the requester of the processing of completion of the processing.

Next, operations of the communication system 10 according to the present example embodiment are described in detail with reference to FIGS. 10 to 12.

Figure 10:
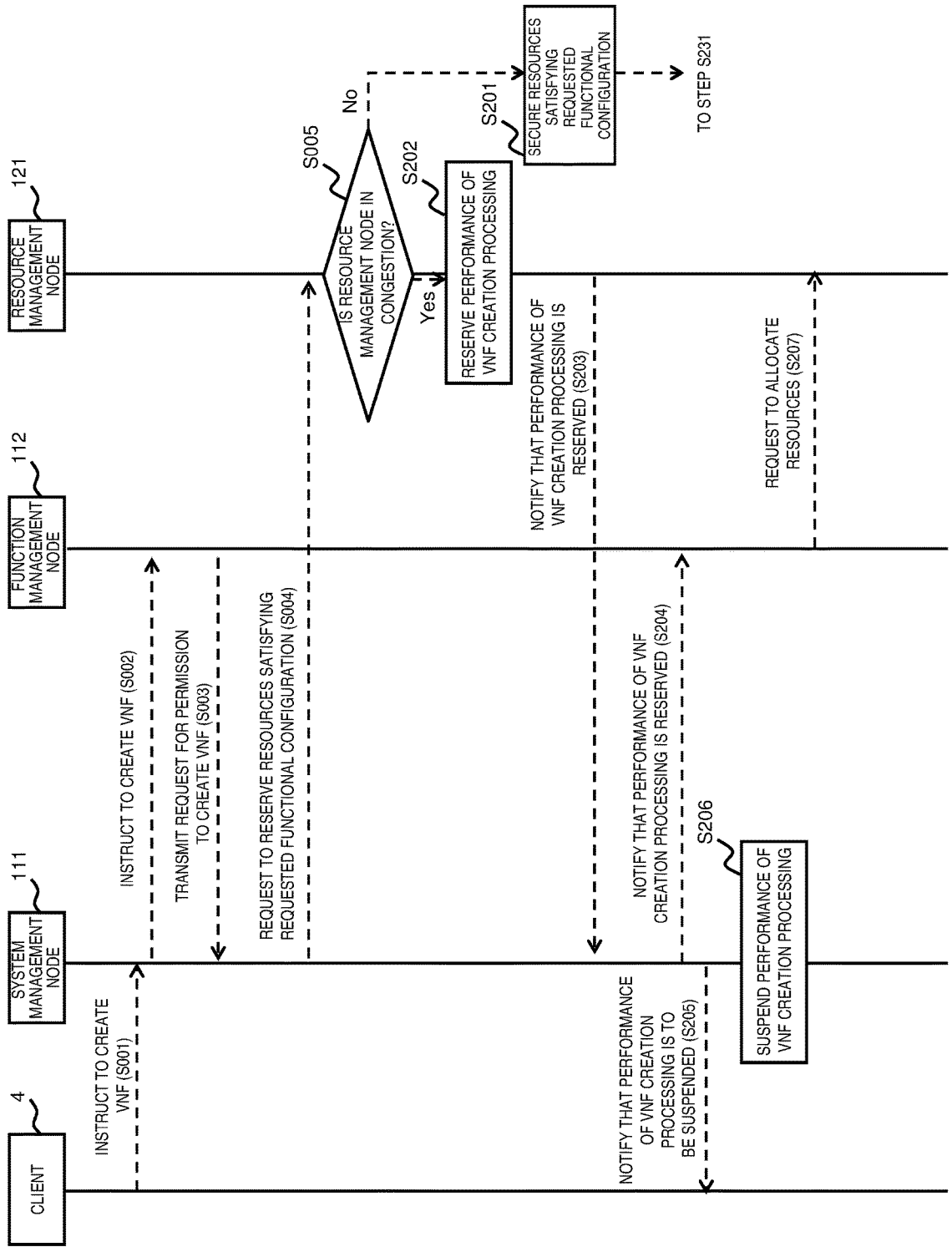
FIG. 10 is a sequence diagram illustrating an example of operations of a communication system 10 according to a third example embodiment.
Figure 11:
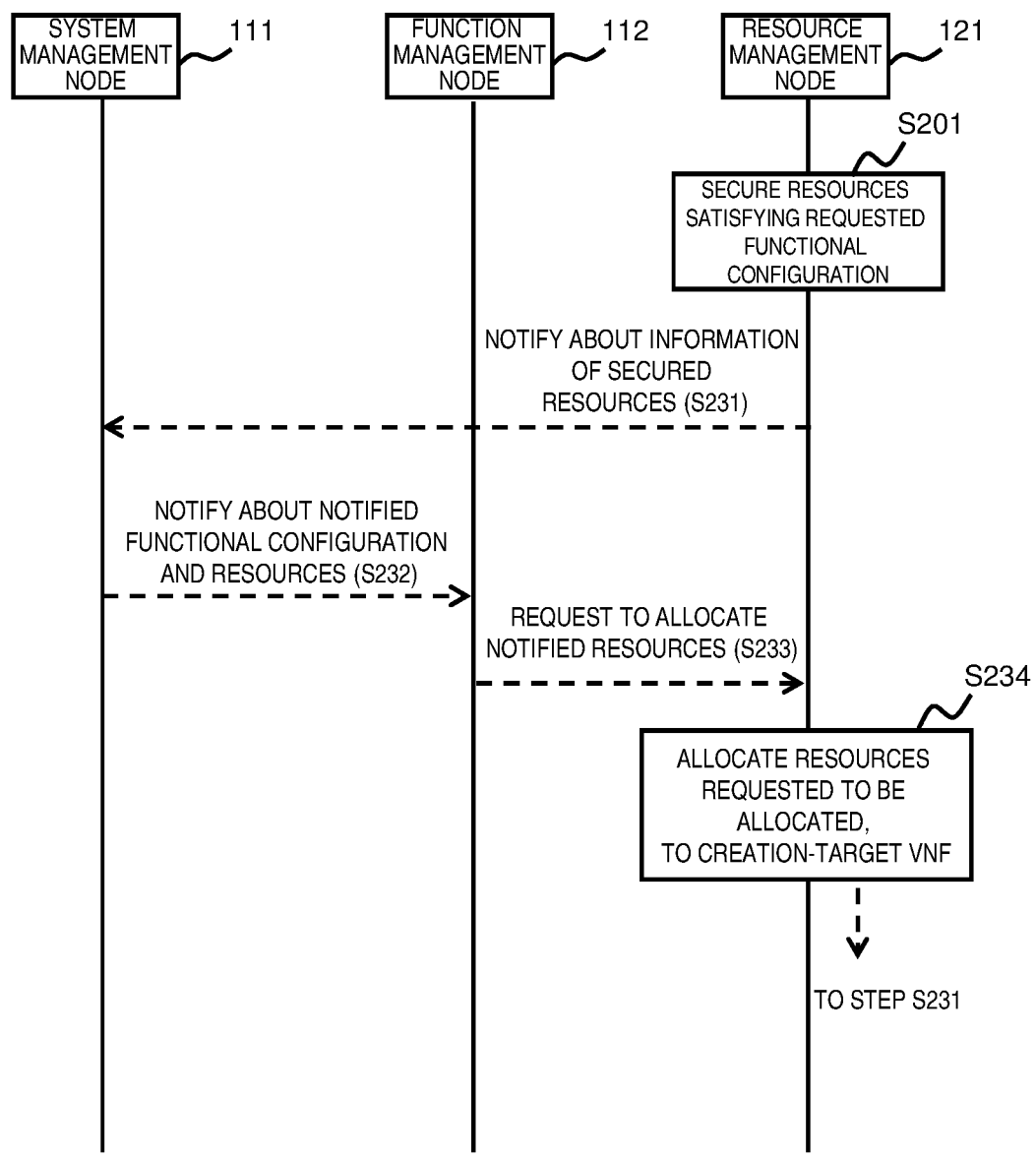
FIG. 11 is a sequence diagram illustrating the example of the operations of the communication system 10 according to the third example embodiment.
Figure 12:
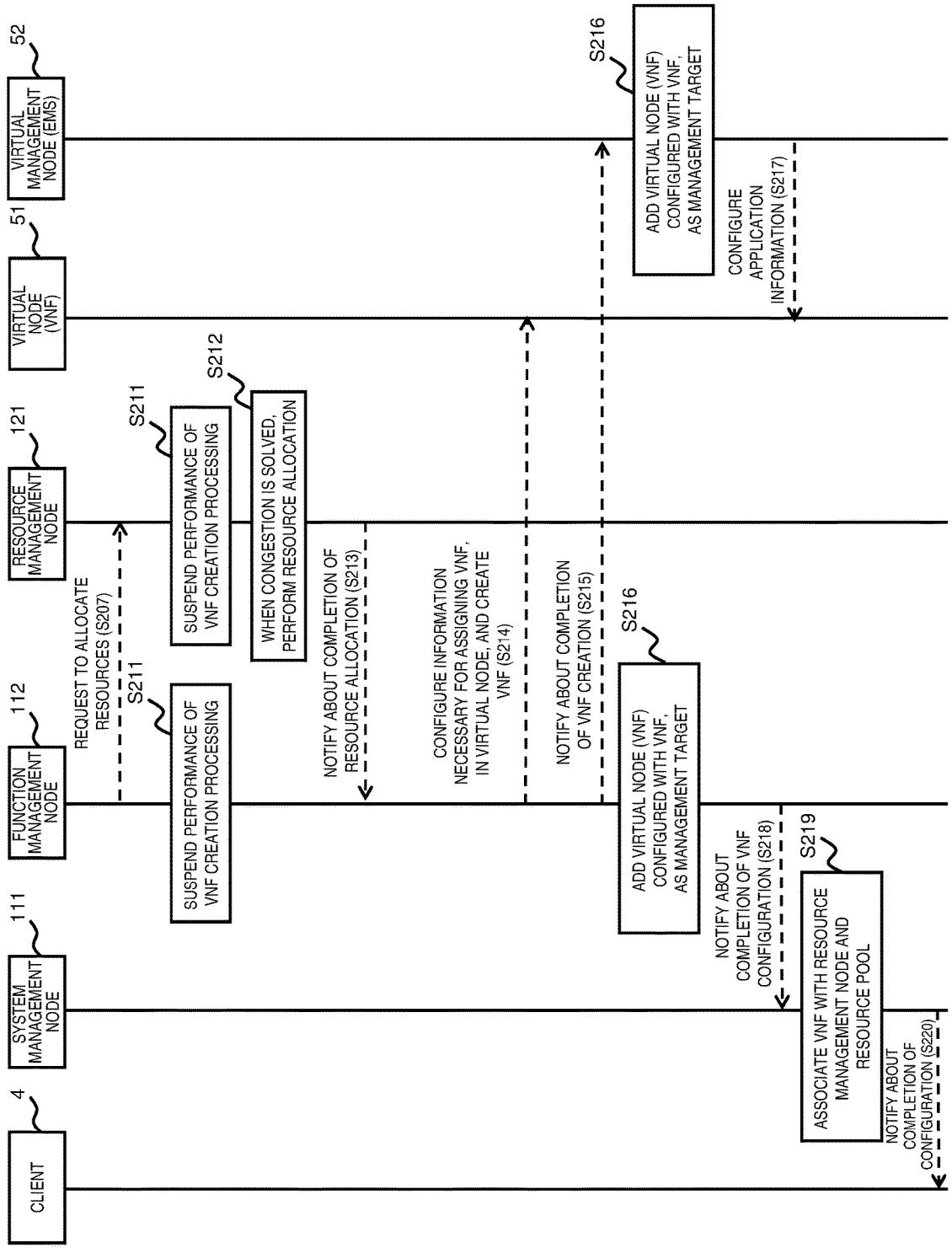
FIG. 12 is a sequence diagram illustrating the example of the operations of the communication system 10 according to the third example embodiment.

FIGS. 10, 11, and 12 are sequence diagrams illustrating examples of the operations of the communication system 10 according to the present example embodiment. Note that, although VNF instantiation processing is described as an example in the following description, this does not intend to limit processing of the management system 1 according to the present example embodiment to the VNF instantiation processing. The processing in the management system 1 according to the present example embodiment may be applied to VNF scale out processing and healing processing. The operations of the communication system 10 to be described below are examples of the communication system 10 according to the present example embodiment, and the description is not intended to limit operations of the communication system 10 to the operations to be described below. Note that the processing in Step S001 to Step S004 illustrated in FIG. 10 is similar to the processing in Step S001 to Step S004 illustrated in FIG. 4, and hence detailed descriptions thereof are omitted.

When the resource management node 121 accepts a request to reserve resources from the system management node 111, the resource management node 121 determines whether or not the resource management node 121 is in congestion (Step S005 illustrated in FIG. 10). When the resource management node 121 is not in congestion (No at branch in Step S005), the resource management node 121 secures resources satisfying the requested functional configuration (Step S201). Then, the processing advances to Step S231 illustrated in FIG. 11.

Here, with reference to FIG. 11, a case in which the resource management node 121 is not in congestion is described.

When the resource management node 121 secures the resources satisfying a requested functional configuration (Step S201), the resource management node 121 notifies the system management node 111 of information of the secured resources (Step S231). The system management node 111 then notifies the function management node 112 of the notified functional configuration and resources (Step S232). The function management node 112 requests the resource management node 121 to allocate the notified resources (Step S233). The resource management node 121 allocates the resources requested to be allocated, to the creation-target VNF (Step S234). Then, the processing advances to Step S213 illustrated in FIG. 12.

Again, with reference to FIG. 10, a case in which the resource management node 121 is in congestion is described.

When the resource management node 121 is in congestion (Yes at branch in Step S005), the resource management node 121 reserves performance of VNF creation processing (Step S202). The resource management node 121 then notifies the system management node 111 that the performance of the VNF creation processing is reserved (Step S203). The system management node 111 then notifies the function management node 112 that the performance of the VNF creation processing is reserved (Step S204). The system management node 111 further notifies the client 4 that the performance of the VNF creation processing is to be suspended (Step S205).

In Step S206, the system management node 111 suspends the performance of the VNF creation processing.

In Step S207, the function management node 112 requests the resource management node 121 to allocate the resources. Then, the processing advances to Step S211 illustrated in FIG. 12.

Next, the description of the operations of the communication system 10 according to the present example embodiment continues with reference to FIG. 12.

When the function management node 112 requests the resource management node 121 to allocate resources, the function management node 112 and the resource management node 121 suspend performance of the VNF creation processing (Step S211).

Next, a case in which the congestion is solved in the resource management node 121 is described.

When the congestion is solved, the resource management node 121 performs resource allocation (Step S212). In Step S213, the resource management node 121 notifies the function management node 112 of completion of the resource allocation. The processing in Step S214 and Step S215 illustrated in FIG. 12 is similar to the processing in Step S027 and Step S028 illustrated in FIG. 5, and hence detailed descriptions thereof are omitted below. Furthermore, the processing in Step S216 to Step S219 illustrated in FIG. 12 is similar to the processing in S041 to Step S044 illustrated in FIG. 6, and hence detailed descriptions thereof are omitted.

When the system management node 111 associates the VNF with the resource management node 121 and a resource pool (Step S219), the system management node 111 notifies the client 4 of completion of the configuration (Step S220).

As described above, when the resource management node 121 is in congestion, the management system 1 according to the present example embodiment reserves performance of the processing and suspends the performance of the processing related to VNF lifecycle. Reserving performance of the processing related to VNF lifecycle and suspending the performance of the processing stop performance and request of processing in subsequent steps. Consequently, the management system 1 according to the present example embodiment eases congestion of the resource management node 121 and thereby contributes to preventing a failure in performing the processing related to VNF lifecycle. Hence, the management system 1 according to the present example embodiment contributes to appropriately performing the processing related to VNF lifecycle.

Fourth Example Embodiment

Next, a fourth example embodiment is described in detail by using the drawings.

The present example embodiment is a mode in which an upper limit of response wait time is increased in accordance with response time from a node configured to manage VNF resources to thereby ease congestion of the node. Note that descriptions of parts overlapping those in the above-described example embodiments are omitted in the description of the present example embodiment. Furthermore, the same constituent components as those in the above-described example embodiments are denoted by the same reference signs, and descriptions thereof are omitted, in the description of the present example embodiment. Moreover, descriptions of the same advantageous effects as those in the above-described example embodiments are also omitted in the description of the present example embodiment.

An entire configuration of a communication system 10 according to the present example embodiment is as illustrated in FIG. 2. An inner configuration of the communication system 10 according to the present example embodiment is as illustrated in FIG. 3.

In a management system 1 according to the present example embodiment, a first management node 11 (system management node 111 or function management node 112) determines whether or not the resource management node 121 is in congestion, based on a statistic (e.g., the average value) of response times of the resource management node 121.

When the first management node 11 (system management node 111 or function management node 112) determines that the resource management node 121 is in congestion, the first management node 11 (system management node 111 or function management node 112) extends (increases) the upper limit of response wait time from the resource management node 121. In contrast, when the first management node 11 (system management node 111 or function management node 112) determines that the resource management node 121 is not in congestion, the first management node 11 (system management node 111 or function management node 112) configures the upper limit of response wait time from the resource management node 121 at a predetermined time period (configures the upper limit of response wait time back to the upper limit of response wait time before the increase). Note that the upper limit of response wait time means an upper limit of time period for the system management node 111 or the function management node 112 to wait for a response from the resource management node 121.

Specifically, the first management node 11 (system management node 111 or function management node 112) stores a history of response time including a predetermined number of response times for communication with the resource management node 121. Here, the history of the response time is assumed to be a history of response time including a predetermined number of response times before the last communication with the resource management node 121.

When the first management node 11 (system management node 111 or function management node 112) communicates with the resource management node 121, the first management node 11 (system management node 111 or function management node 112) compares a time period for a response from the resource management node 121 with a statistic of the stored response times to thereby determine whether or not the resource management node 121 is in congestion.

For example, the first management node 11 (system management node 111 or function management node 112) determines whether or not the time period for a response from the resource management node 121 exceeds the average value of the stored response times. When the time for a response from the resource management node 121 exceeds the average value of the stored response times, the first management node 11 (system management node 111 or function management node 112) determines that the resource management node 121 is in congestion. In contrast, when the time for a response from the resource management node 121 is equal to or shorter than the average value of the stored response times, the first management node 11 (system management node 111 or function management node 112) determines that the resource management node 121 is not in congestion.

Next, operations of the communication system 10 according to the present example embodiment are described in detail with reference to FIGS. 13 and 14.

Figure 13:
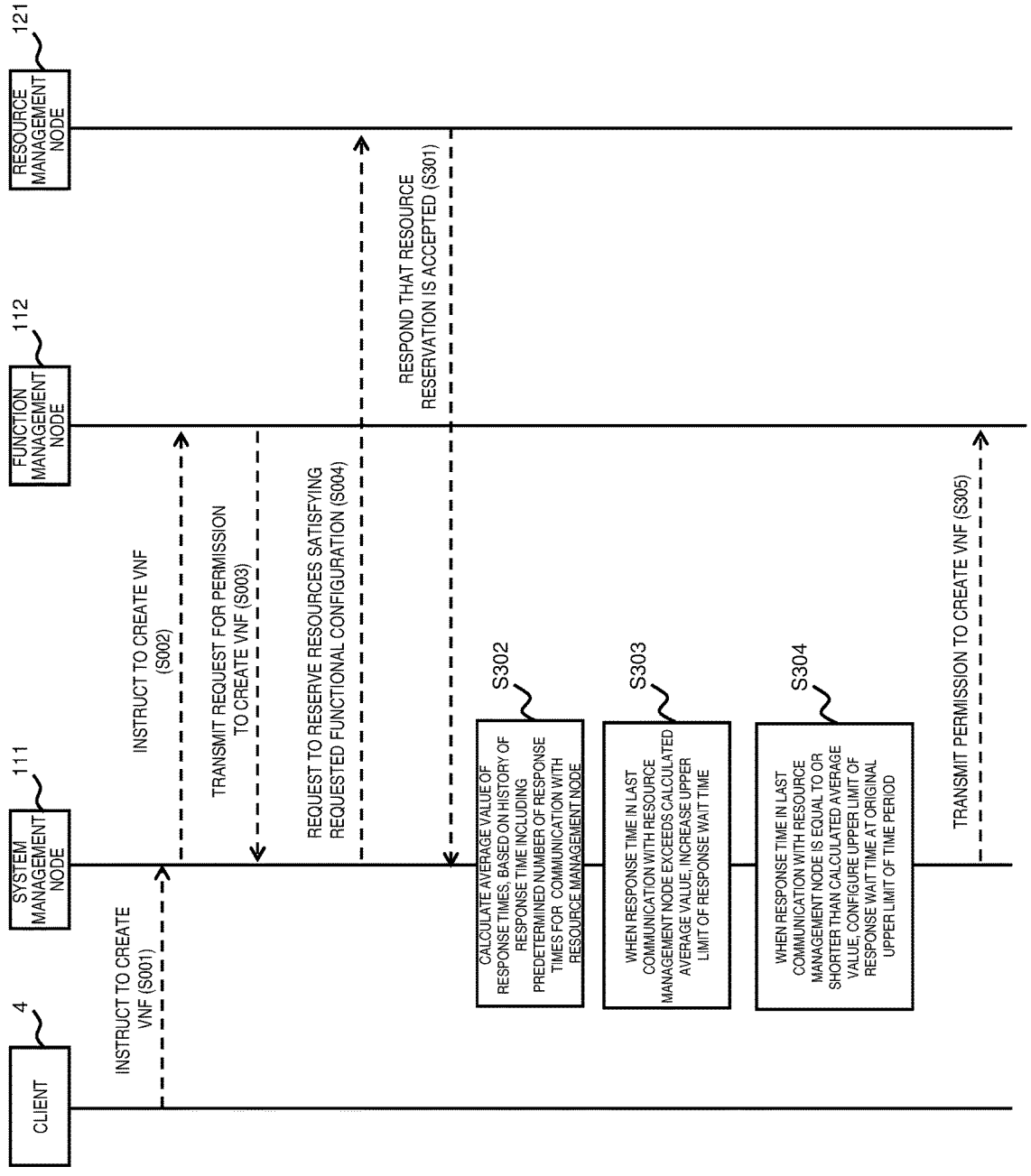
FIG. 13 is a sequence diagram illustrating an example of operations of a communication system 10 according to a fourth example embodiment.
Figure 14:
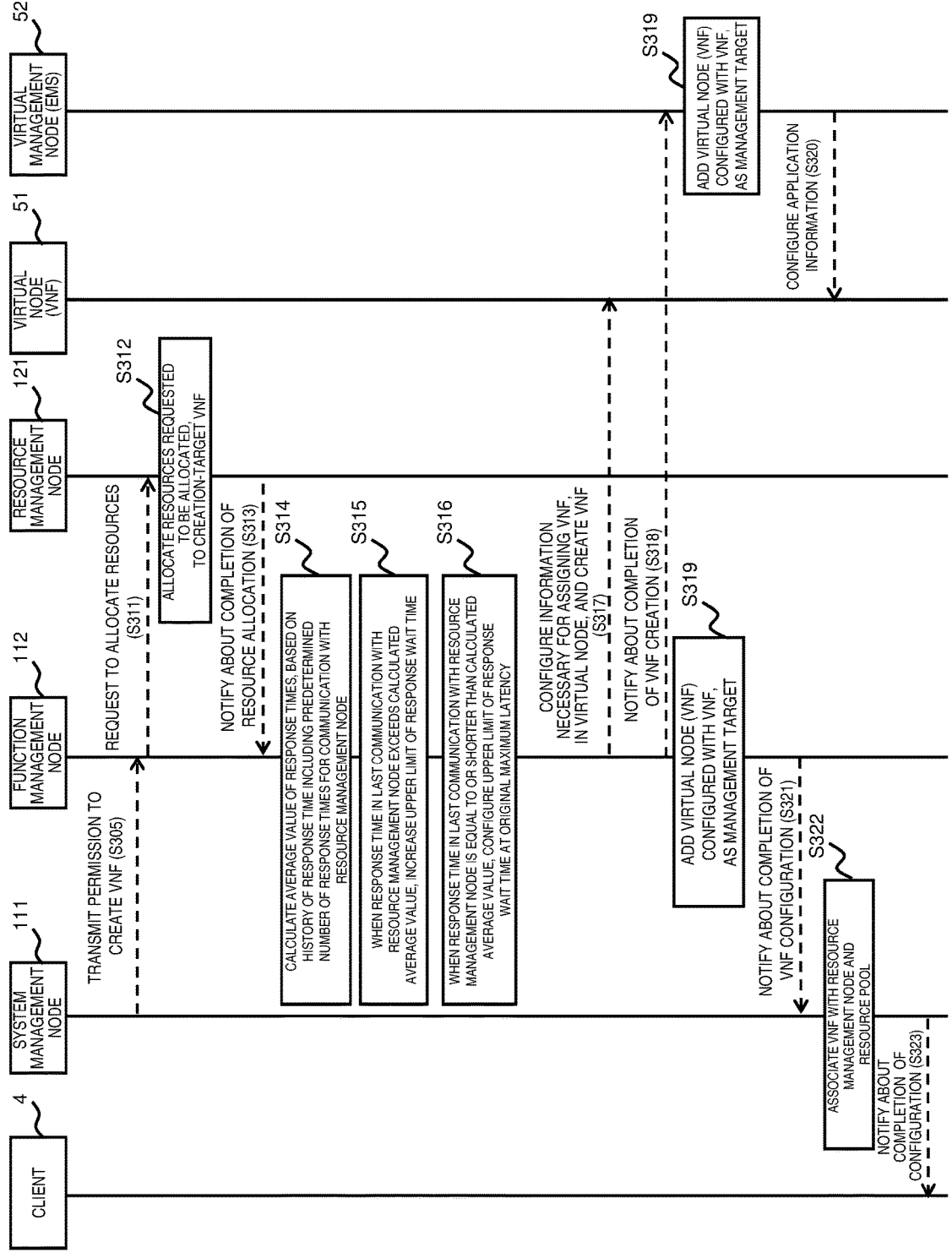
FIG. 14 is a sequence diagram illustrating the example of the operations of the communication system 10 according to the fourth example embodiment.

FIGS. 13 and 14 are sequence diagrams illustrating examples of the operations of the communication system 10 according to the present example embodiment. Note that, although VNF instantiation processing is described as an example in the following description, this does not intend to limit processing of the management system 1 according to the present example embodiment to the VNF instantiation processing. The processing in the management system 1 according to the present example embodiment may be applied to VNF scale out processing and healing processing. The operations of the communication system 10 to be described below are examples of the communication system 10 according to the present example embodiment, and the description is not intended to limit operations of the communication system 10 to the operations to be described below. Note that the processing in Step S001 to Step S004 illustrated in FIG. 13 is similar to the processing in Step S001 to Step S004 illustrated in FIG. 4, and hence detailed descriptions thereof are omitted.

When the resource management node 121 accepts a request to reserve resources from the system management node 111, the resource management node 121 responds to the system management node 111 that resource reservation is accepted (Step S301 illustrated in FIG. 13).

In Step S302, the system management node 111 calculates the average value of the response times for communication with the resource management node 121, based on the history of response time including a predetermined number of response times.

In Step S303, when the response time exceeds the calculated average value in the last communication with the resource management node 121 (e.g., processing in Step S301), the system management node 111 extend (increases) the upper limit of response wait time. In contrast, in Step S304, when the response time is equal to or shorter than the calculated average value in the last communication with the resource management node 121 (e.g., processing in Step S301), the system management node 111 configures the upper limit of response wait time at an original upper limit of time period (predetermined upper limit of time period).

In Step S305, the system management node 111 transmits a permission to create the VNF to the function management node 112. Then, the processing advances to Step S311 illustrated in FIG. 14.

Next, the description of the operations of the communication system 10 according to the present example embodiment continues with reference to FIG. 14.

When the function management node 112 receives the permission to create the VNF from the system management node 111, the function management node 112 requests the resource management node 121 to allocate the resources (Step S311).

In Step S312, the resource management node 121 allocates the resources requested to be allocated, to the creation-target VNF.

In Step S313, the resource management node 121 notifies the function management node 112 of completion of the resource allocation.

In Step S314, the function management node 112 calculates the average value of the response times for communication with the resource management node 121, based on the history of response time including a predetermined number of response times.

In Step S315, when the response time exceeds the calculated average value in the last communication with the resource management node 121 (e.g., processing in Step S313), the function management node 112 increases the upper limit of response wait time. In contrast, in Step S316, when the response time is equal to or shorter than the calculated average value in the last communication with the resource management node 121 (e.g., processing in Step S313), the function management node 112 configures the upper limit of response wait time at an original upper limit of time period (predetermined upper limit of time period). The processing in Step S317 and Step S318 illustrated in FIG. 14 is similar to the processing in Step S027 and Step S028 illustrated in FIG. 5, and hence detailed descriptions thereof are omitted below. Furthermore, the processing in Step S319 to Step S322 illustrated in FIG. 14 is similar to the processing in Step S041 to Step S044 illustrated in FIG. 6, and hence detailed descriptions thereof are omitted.

When the system management node 111 associates the VNF with the resource management node 121 and a resource pool (Step S322), the system management node 111 notifies the client 4 of completion of the configuration (Step S323).

As described above, the management system 1 according to the present example embodiment increases the upper limit of response wait time of the first management node 11 (system management node 111 or function management node 112) in accordance with time for a response from the resource management node 121 to the first management node 11 (system management node 111 or function management node 112). Increasing the upper limit of response wait time of the first management node 11 (system management node 111 or function management node 112) suppresses the communication traffic between the first management node 11 (system management node 111 or function management node 112) and the resource management node 121. Consequently, the management system 1 according to the present example embodiment eases congestion of the resource management node 121 and thereby contributes to preventing a failure in performing the processing related to VNF lifecycle. Hence, the management system 1 according to the present example embodiment contributes to appropriately performing the processing related to VNF lifecycle.

Note that, in the above descriptions, the configuration in which the function management node 112 manages information of resources necessary with a functional configuration of a VNF has been described. However, this does not intend to limit operations of the communication system 10 according to the present example embodiment. For example, the system management node 111 may manage information of resources necessary for a functional configuration of a VNF. Alternatively, the system management node 111 and the function management node 112 may manage information of resources necessary for a functional configuration of a VNF.

A part or the whole of above-described example embodiments can be described as, but is not limited to, the following modes.

(Mode 1)
A management system including: a first management node configured to instruct a second management node to perform processing for managing resources for a virtualised network function; and the second management node configured to perform, in response to an instruction from the first management node, the processing for managing the resources for the virtualised network function, wherein, when the second management node is in congestion, at least one of the first management node and the second management node performs processing for suppressing communication traffic between the first management node and the second management node.

(Mode 2)
The management system, in which, when the second management node is in congestion, the second management node secures resources for the virtualised network function with a functional configuration smaller than a requested functional configuration.

(Mode 3)
The management system, in which, when the second management node is in congestion, the first management node suspends performance of the processing for managing the resources for the virtualised network function until the congestion is solved.

(Mode 4)
The management system, in which, when the second management node is in congestion and the processing for managing the resources for the virtualised network function is instructed from the first management node, the second management node reserves performance of the instructed processing and suspends the performance of the instructed processing until the congestion is solved.

(Mode 5)
The management system, in which the first management node calculates, based on a record of a predetermined number of response times, an average value of the response times, and determines, when a response time of the second management node exceeds the average value of the response times, that the second management node is in congestion and extends (increases) an upper limit of response wait time from the second management node.

(Mode 6)
The management system, in which, when the congestion of the second management node is solved, at least one of the first management node and the second management node removes suppression of communication traffic between the first management node and the second management node.

(Mode 7)
A management apparatus that instructs a predetermined apparatus to perform processing for managing resources for a virtualised network function, wherein, when the predetermined apparatus is in congestion, the management apparatus performs processing for suppressing communication traffic between the predetermined apparatus and the management apparatus itself.

(Mode 8)
The management apparatus, in which the management apparatus manages the virtualised network function and suspends, when the predetermined apparatus is in congestion, performance of the processing for managing the virtualised network function until the congestion is solved.

(Mode 9)
The management apparatus, in which the management apparatus determines, based on a statistic of response times of the predetermined apparatus, whether or not the predetermined apparatus is in congestion, and increases, when the predetermined apparatus is in congestion, an upper limit of response wait time from the predetermined node.

(Mode 10)
The management apparatus, in which, when the congestion of the predetermined apparatus is solved, the management apparatus removes suppression of communication traffic between the predetermined apparatus and the management apparatus itself.

(Mode 11)
A management apparatus that performs processing for managing resources for a virtualised network function in response to an instruction from a predetermined apparatus, wherein, when the management apparatus itself is in congestion, the management apparatus performs processing for suppressing communication traffic between the predetermined apparatus and the management apparatus itself.

(Mode 12)
The management apparatus, in which, when the management apparatus itself is in congestion, the management apparatus secures resources for the virtualised network function with a functional configuration smaller than a requested functional configuration.

(Mode 13)
The management apparatus, in which, when the management apparatus itself is in congestion and the processing for managing the resources for the virtualised network function is instructed from the predetermined apparatus, the management apparatus reserves a request for the instructed processing and suspends performance of the instructed processing until the congestion is solved.

(Mode 14)

The management apparatus, in which, when the congestion of the management apparatus itself is solved, the management apparatus removes suppression of communication traffic between the predetermined apparatus and the management apparatus itself.

(Mode 15)

A management method performed by a management system including a first management node and a second management node, the management method including, suppressing communication traffic between the first management node and the second management node when the second management node is in congestion, wherein the first management node configured to instruct a second management node to perform processing for managing resources for a virtualised network function and the second management node configured to perform, in response to an instruction from the first management node, the processing for managing the resources for the virtualised network function.

(Mode 16)

The management method including securing resources for the virtualised network function with a functional configuration smaller than a requested functional configuration when the second management node is in congestion.

(Mode 17)

The management method including suspending performance of the processing for managing the resources for the virtualised network function until the congestion is solved when the second management node is in congestion.

(Mode 18)

The management method including reserving performance of the processing for managing the resources for the virtualised network function and suspending the performance of the instructed processing until the congestion is solved when the second management node is in congestion.

(Mode 19)

The management method including determining, based on a statistic of response times of the second management node, whether or not the second management node is in congestion; and extending (increasing) an upper limit of response wait time from the second management node when the second management node is in congestion.

(Mode 20)

The management method including removing suppression of communication traffic between the first management node and the second management node when the congestion of the second management node is solved.

(Mode 21)

A program executed by a management system including a first management node and a second management node, the program causing the management system to perform processing for suppressing communication traffic between the first management node and the second management node when the second management node is in congestion, wherein the first management node configured to instruct a second management node to perform processing for managing resources for a virtualised network function, and the second management node configured to perform, in response to an instruction from the first management node.

The mode described in Mode 21 above, as the mode described in Mode 15, can be developed to the modes described in Modes 16 to 20.

Note that the disclosures of the above-mentioned Patent Literatures and Non-Patent Literature are incorporated herein by reference. Making a change and adjustment of the example embodiments is allowed within the framework of the entire disclosure (including the scope of the claims) of the present invention, and also based on a basic technical concept of the present invention. Further, various combination or selection of various disclosed elements (including each element of each claim, each element of each example embodiment, each element of each drawing, and the like) is allowed within the framework of the entire disclosure of the present invention. Specifically, as a matter of course, the present invention encompasses various modifications and amendments that may be achieved by a person skilled in the art based on the entire disclosure including the scope of the claims and the technical concept. Regarding a numerical range described herein, in particular, it should be interpreted that any numerical value or any smaller range included within the range is specifically described even without particular description.

REFERENCE SIGNS LIST

1, 1000 Management system
2, 1010 VNF
3, 1020 Resources
4 Client
5 VNF layer
6 Resource layer
7 Communication service node
10 Communication system
11, 1001 First management node
12, 1002 Second management node
51, 51-$a$ to 51-$c$ Virtual node (VNF)
52, 52-$a$ to 52-$c$ Virtual management node (EMS)
61 Control part (hardware)
62 Storage part (hardware)
63 Communication part (hardware)
64 Virtualisation layer
65 Virtual control part
66 Virtual storage part
67 Virtual communication part
111 System management node
112 Function management node
121 Resource management node

The invention claimed is:

1. A NFV MANO (Management and Orchestration) system comprising:

a NFVO (Network Functions Virtualisation Orchestrator)/VNFM (Virtualised Network Functions Manager) that instructs a VIM (Virtualised Infrastructure Manager) to perform processing for managing resources for a virtualised network function; and the VIM that performs, in response to an instruction from the NFVO/VNFM, the processing for managing the resources for the virtualised network function, wherein, the NFVO/VNFM calculates, based on a history of response time including a predetermined number of response times, an average value of the response times, and determines, when a response time of the VIM exceeds the average value, that the VIM is in congestion, when the VIM is in congestion, at least one of the NFVO/VNFM and the VIM performs processing for suppressing communication traffic between the NFVO/VNFM and the VIM, and when the VIM is in congestion, the VIM secures resources for the virtualised network function with a functional configuration smaller than a functional configuration requested by the NFVO/VNFM.

2. The NFV MANO system according to claim 1, wherein, when the VIM is in congestion and the processing for managing the resources for the virtualised network function is instructed from the NFVO/VNFM, the VIM reserves performance of the instructed processing and suspends the performance of the instructed processing until the congestion is solved.

3. A management method performed by a NFV MANO system including a NFVO/VNFM and a VIM, the management method comprising, determining, based on a statistic of response times of the VIM, whether or not the VIM is in congestion, extending a response wait time from the VIM when the VIM is in congestion, suppressing communication traffic between the NFVO/VNFM and the VIM when the VIM is in congestion, and securing resources for a virtualised network function with a functional configuration smaller than a functional configuration requested by the NFVO/VNFM when the VIM is in congestion, wherein the NFVO/VNFM that instructs the VIM to perform processing for managing resources for the virtualised network function and the VIM that performs, in response to an instruction from the NFVO/VNFM, the processing for managing the resources for the virtualised network function.

4. The management method according to claim 3, the management method comprising, reserving performance of the processing for managing the resources for the virtualised network function and suspending the performance of the instructed processing until the congestion is solved when the VIM is in congestion.

5. A non-transitory computer-readable storage medium storing a program executed by a NFV MANO system including a NFVO/VNFM and a VIM, the program causing the NFV MANO system to perform processing for:

determining, based on a statistic of response times of the VIM, whether or not the VIM is in congestion, extending a response wait time from the VIM when the VIM is in congestion, suppressing communication traffic between the NFVO/VNFM and the VIM when the VIM is in congestion, and securing resources for a virtualised network function with a functional configuration smaller than a functional configuration requested by the NFVO/VNFM when the VIM is in congestion, wherein the NFVO/VNFM that instructs the VIM to perform processing for managing resources for the virtualised network function and the VIM that performs, in response to an instruction from the NFVO/VNFM, the processing for managing the resources for the virtualised network function.

6. The non-transitory computer-readable storage medium storing the program according to claim 5, the program causing the NFV MANO system to perform processing for:

reserving performance of the processing for managing the resources for the virtualised network function and suspending the performance of the instructed processing until the congestion is solved when the VIM is in congestion.

* * * * *